(12) United States Patent
Gidlund

(10) Patent No.: US 9,079,648 B2
(45) Date of Patent: Jul. 14, 2015

(54) DEVICE FOR BOAT PROPULSION OR ENERGY PRODUCTION

(75) Inventor: Per Gidlund, Sundbyberg (SE)

(73) Assignee: Cosmomind AB, Sundyberg (SE)

( * ) Notice: Subject to any disclaimer, the term of this patent is extended or adjusted under 35 U.S.C. 154(b) by 191 days.

(21) Appl. No.: 13/876,967

(22) PCT Filed: Oct. 3, 2011

(86) PCT No.: PCT/SE2011/000171
§ 371 (c)(1),
(2), (4) Date: Apr. 23, 2013

(87) PCT Pub. No.: WO2012/044226
PCT Pub. Date: Apr. 5, 2012

(65) Prior Publication Data
US 2013/0203307 A1     Aug. 8, 2013

(30) Foreign Application Priority Data
Oct. 1, 2010   (SE) ...................................... 1051025

(51) Int. Cl.
| | |
|---|---|
| *B63H 1/04* | (2006.01) |
| *B63H 1/34* | (2006.01) |
| *B63H 5/03* | (2006.01) |
| *B63H 5/02* | (2006.01) |
| *F03B 17/06* | (2006.01) |

(52) U.S. Cl.
CPC .. *B63H 5/03* (2013.01); *B63H 1/04* (2013.01); *B63H 5/02* (2013.01); *F03B 17/066* (2013.01); *Y02B 10/30* (2013.01); *Y02E 10/28* (2013.01)

(58) Field of Classification Search
CPC ....... Y02E 10/28; F03B 17/066; F03B 9/005; Y02B 10/30; B63H 5/02; B63H 1/04; B60F 3/0007
USPC ........ 290/53, 54; 440/12.56, 12.58, 12.59, 91
See application file for complete search history.

(56) References Cited

U.S. PATENT DOCUMENTS 1,460,331 A  *  6/1923  Tarbet ................................ 415/5
6,809,430 B2 *  10/2004  Diederich ....................... 290/54

FOREIGN PATENT DOCUMENTS

| DE | 20312364 | 10/2003 |
| DE | 10358240 | 6/2005 |

(Continued)

OTHER PUBLICATIONS

International Search Report for corresponding International Application No. PCT/SE2011/000171 mailed Nov. 11, 2011.

*Primary Examiner* — S. Joseph Morano
*Assistant Examiner* — Anthony Wiest
(74) *Attorney, Agent, or Firm* — Renner, Otto, Boisselle & Sklar, LLP

(57) ABSTRACT

Propulsion device for boats or device or energy production comprising: a first track a second track; driving wheels each having a peripheral surface comprising a friction device rotatably arranged in at least one frame, wherein the first track is arranged in contact with the friction devices at a first set of driving wheels, the second track is arranged in contact with the friction devices at a second set of driving wheels, such that the tracks move with the same speed as the peripheral surface of the rotatable driving wheels where the track is in contact with the friction devices when the driving wheels rotate; a plurality of shovel rollers each comprising a first and a second end and between the ends a device with an outer periphery, wherein the first ends of the shovel rollers are arranged in the first track and the second ends of the shovel rollers are arranged in the second track such that the shovel rollers move with the tracks in relation to the structure when the driving wheels rotate, wherein the device further comprises a flat continuous carpet-like device with side-ends which is arranged between the first and second sets of driving wheels and abutting the outer periphery of the shovel rollers; that the carpet-like device forms a shovel surface between two of the shovel rollers, and that the formed shovel moves in relation to the frame when the shovel rollers move in relation to the frame.

21 Claims, 21 Drawing Sheets

(56) References Cited

FOREIGN PATENT DOCUMENTS

| | | |
|---|---|---|
| DE | 102004012712 | 10/2005 |
| DE | 102005051969 | 5/2007 |
| WO | 2008/108684 | 9/2008 |
| WO | 2010/060911 | 6/2010 |

* cited by examiner

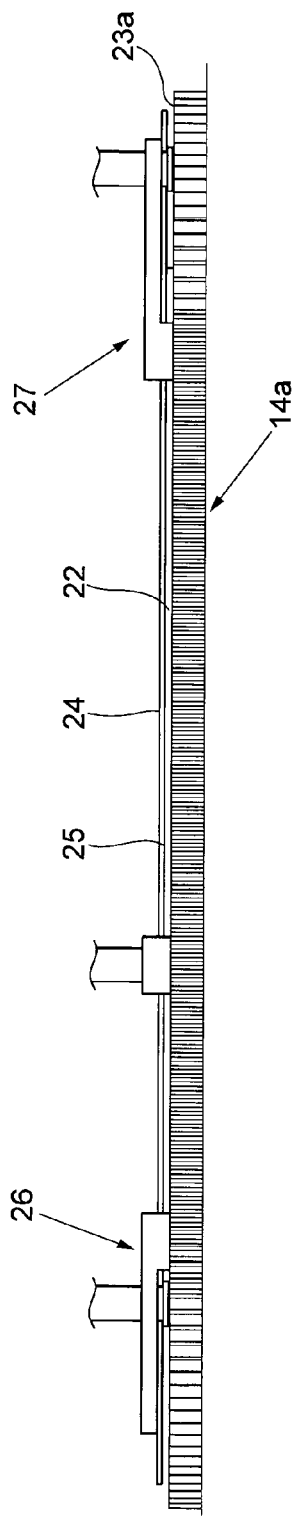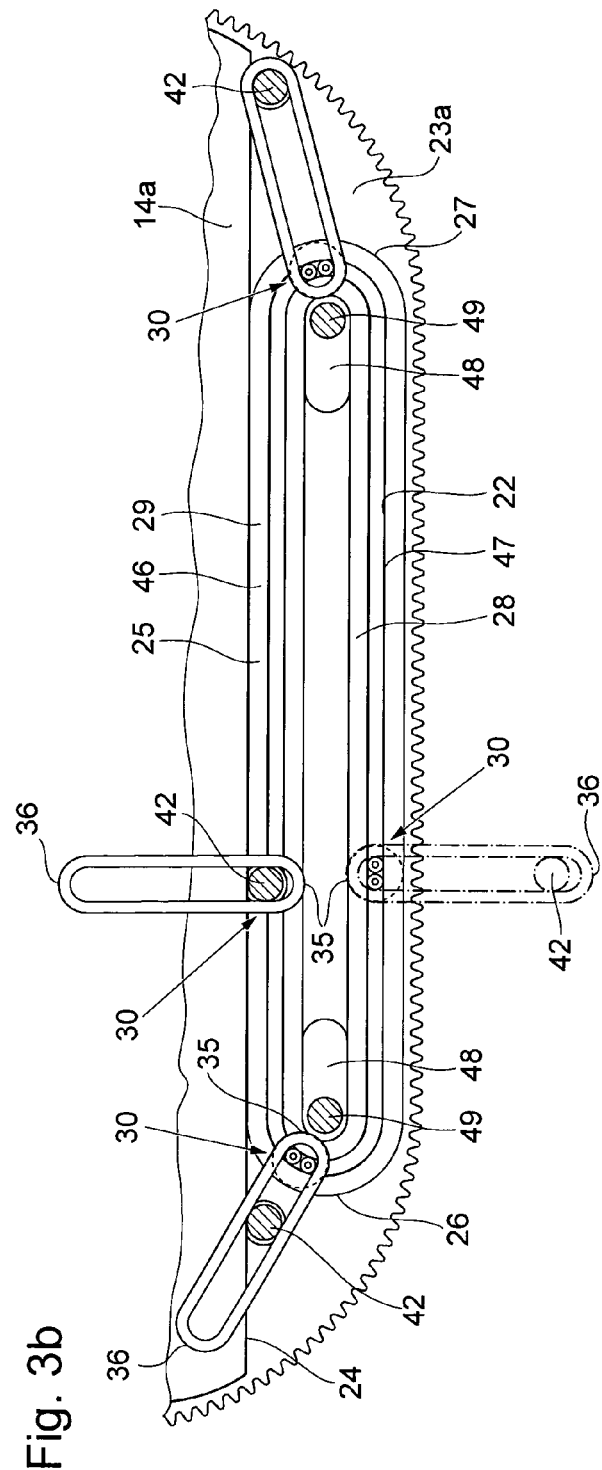
Fig. 3a
Fig. 3b

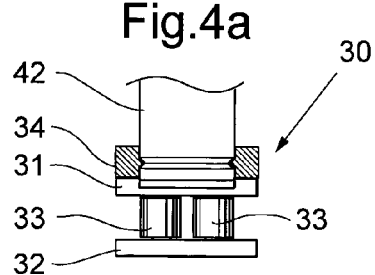
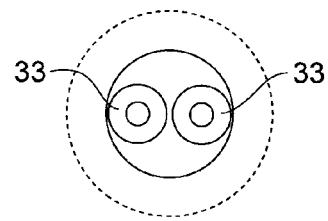
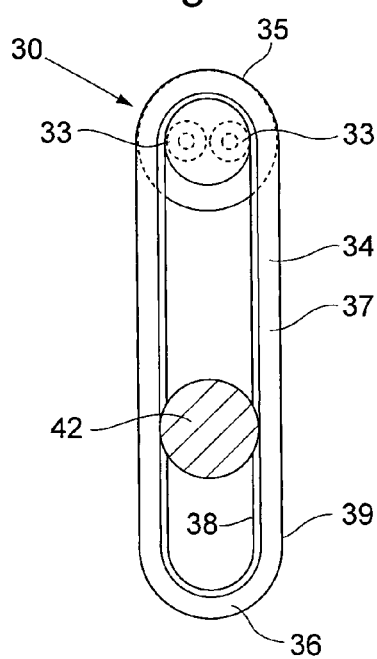
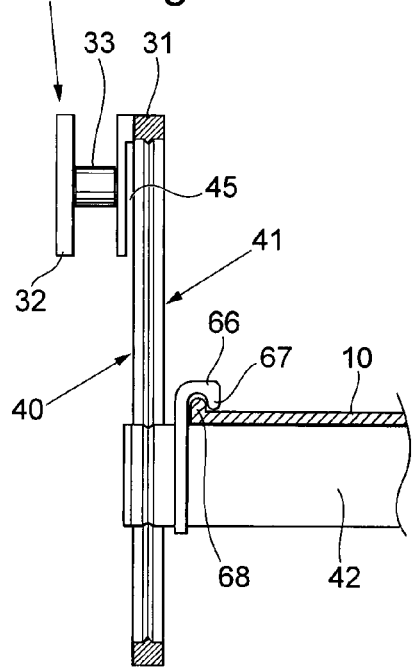
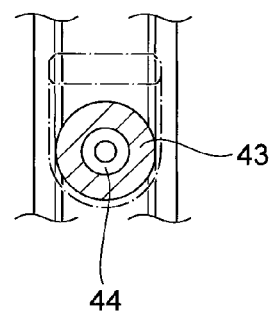

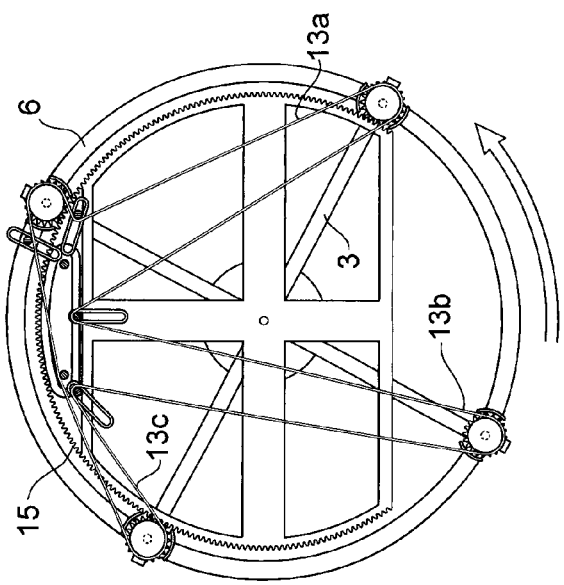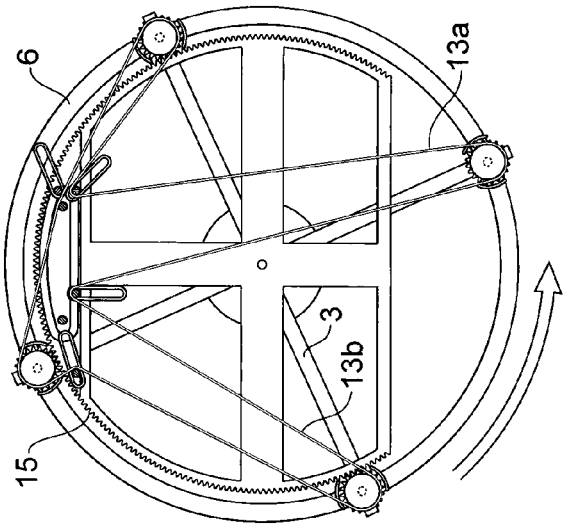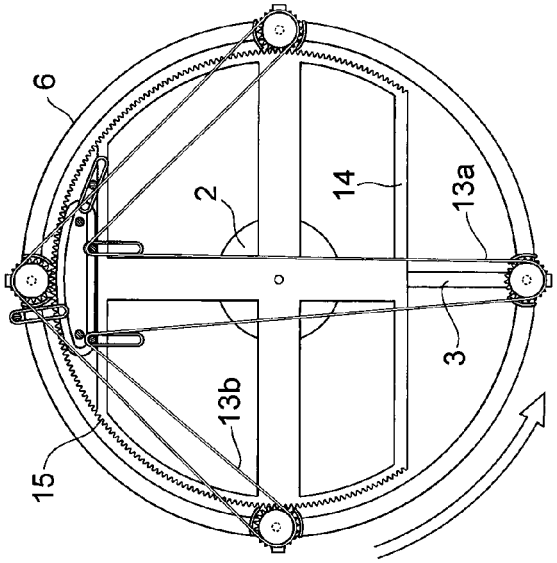

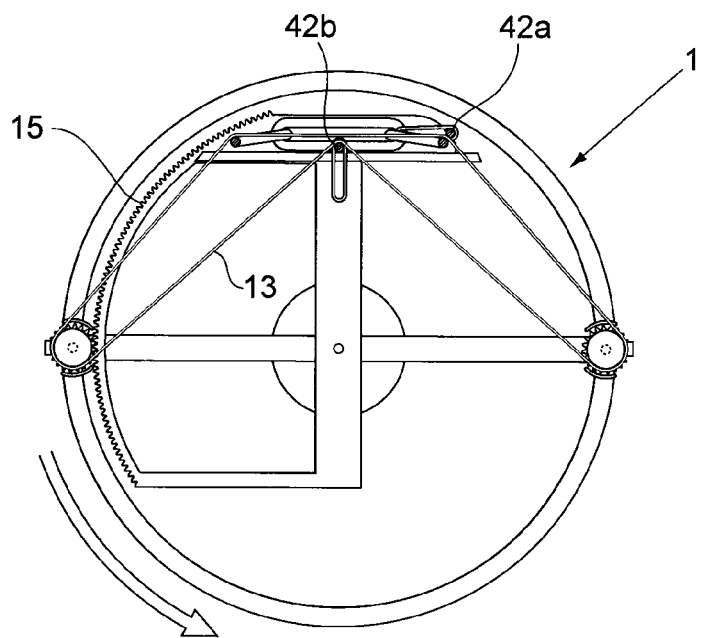
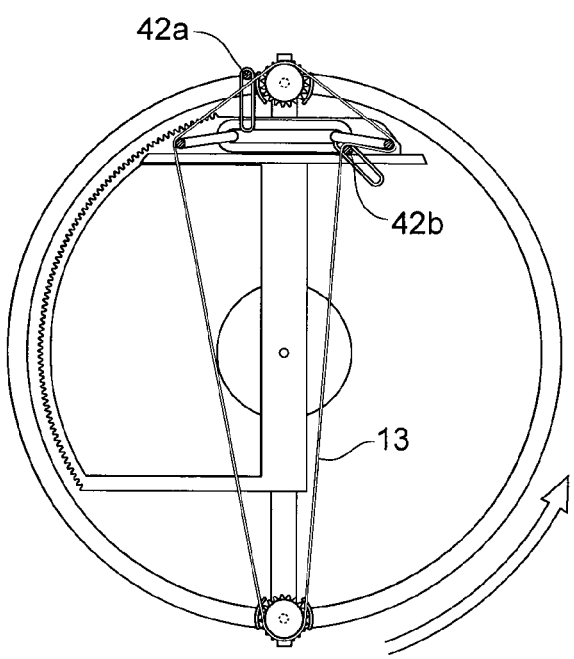

DEVICE FOR BOAT PROPULSION OR ENERGY PRODUCTION

This application is a national phase of International Application No. PCT/SE2011/000171 filed Oct. 3, 2011 and published in the English language. This application claims priority to Swedish Application No. 1051025-3 filed Oct. 1, 2010, which is hereby incorporated herein by reference.

TECHNICAL FIELD

The present invention relates generally to a propulsion device (also herein referred to as an apparatus) for boats in a first embodiment.

The present invention relates generally to a device (also herein referred to as an apparatus) for energy production in a second embodiment.

BACKGROUND ART

It is known to use propulsion devices of rotating paddle wheel type for boats, e.g. pedalos for recreational use, smaller fishing boats for recreational fishing or other light vessels. To maximize the propulsion efficiency such devices requires that the propulsive paddle wheels are located to at least 50% above water level. If a larger share of the paddle wheel is located below the water level the opposing force, in a direction opposite the direction of movement, will increase. This is partly due to the upper paddles direction of movement but also due to the increased friction in the water. Further, the part of the paddle wheel that is above the water level takes up space in the boat in an already limited space, alternatively obscures the view if the paddle wheels are located on the sides of the boat. This part will further act as an air hole and substantially increase the air resistance of the boat in an environment that is windy and thus decrease the propulsion efficiency. Since this type of propulsion device requires that the paddle wheel size increases if an increased propulsion speed is desirable the above mentioned negative effects will increase further. Boats with paddle wheel propulsion are also sensitive for heavy seas. High waves will lead to that a larger share of the paddles is located above the water level which will further decrease the propulsion efficiency. To increase the usability of these type of boats, there has also been a demand to be able to drive these on land, at least shorter distances such as after discharging from a trailer or parking place to the water, or for working crafts suited for mussel/oyster harvest at breeding places in coastal areas with ebb and tide.

It is known to use wind power plants and paddle wheels with shovels of rotating type for energy production. It is further known to use wave power plants that utilize the upward and downward movements of the waves for extracting energy. The drawback of existing solutions for energy production through wind power plants is that these are so-called fast runners which must be stopped at strong winds in order not to risk failure through loss of the rotor blades. A device with rotating paddle wheels placed in water for energy production must be placed in places such that the shovels are allowed to rotate freely, and such that its impact on the surrounding environment is minimized. The wave power plants ability to extract energy is dependent on the access to relatively high waves, i.e. differences between crests and throughs of the sea.

SUMMARY OF INVENTION

An object of the present invention is to improve the propulsion device of boats, preferably boats of smaller type such as pedalos for recreational use, smaller fishing boats for recreational fishing and other vessels. The invention enables propulsion of boats in a more energy efficient manner compared to previous solutions for pedalos, for instance of paddle wheel type. Further, the invention enables that the propulsion device can be placed essentially under water. This enables that no already limited space in the boat is taken up by a paddle wheel or obscures the view, that the air resistance is minimized and that the propulsion device is less sensitive to heavy seas. Moreover, the invention will enable a more silent propulsion than normal paddle wheel propelled vessels due to the placement of the device below the water level.

The above objective is reached according to the invention by a device comprising:
a first track;
a second track;
driving wheels each having a peripheral surface comprising a friction device rotatably arranged in at least one frame, wherein
the first track is arranged in contact with the friction devices at a first set of driving wheels,
the second track is arranged in contact with the friction devices at a second set of driving wheels,
such that the tracks move with the same speed as the peripheral surface of the rotatable driving wheels where the track is in contact with the friction devices when the driving wheels rotate;
characterized in that a plurality of shovel rollers each comprising
a first and a second end and between the ends a device with an outer periphery,
the first ends of the shovel rollers are arranged in the first track and the second ends of the shovel rollers are arranged in the second track such that the shovel rollers move with the tracks in relation to the structure when the driving wheels rotate,
wherein the device further comprises a flat continuous carpet-like device with side-ends which is arranged between the first and second sets of driving wheels and abutting the outer periphery of the shovel rollers;
the carpet-like device forms a shovel surface between two of the shovel rollers, and that the formed shovel moves in relation to the frame when the shovel rollers move in relation to the frame.

A second objective of the invention is to enhance a device for energy production, preferably from wind, wave power and flowing water. The invention can be used for extracting energy from wind power and can unlike the existing technology be used in strong winds above 25 meters/second without risk for failure, and where a possible failure have very limited negative consequences, compare for instance a loss of a rotor blade with a destroyed carpet-like device. The device according to the invention can further be manufactured with large dimensions, with a large wind capturing carpet-like device to be able to extract more energy and can moreover be adjusted by changing the angle to the wind as needed and thereby increase the efficiency even further. Unlike so-called fast runners the device according to the invention further generate considerably less vibrations which makes it suitable to use on for instance rooftops.

When using a device according to the invention for extracting energy from flowing water, the freedom of placing the device is considerable unlike the known technology. The device can be placed entirely under the water level such as e.g. close to the seabed and be fastened there since no protruding shovels exist that move in a direction opposite the flow direction. Thereby the negative effects that a device in a sea environment could have as being an obstacle for boat traffic or for purely esthetical reasons are eliminated. Damage to fish and other living creatures is further minimized.

The device according to the invention, placed on the water surface, can further extract energy even from smaller 1-3 meter waves which is an advantage compared to the wave power technologies of today.

According to the invention, the above mentioned objective is met by that the invention described above is arranged above, on or below the water level for generating energy when water waves, flowing water or wind make the shovel of the device move in relation to the frame, such that this movement can be used for mechanically drive another device or for storing energy in a energy storage device.

BRIEF DESCRIPTION OF DRAWINGS

The invention is now described, by way of example, with reference to the accompanying drawings, in which:

FIG. 3a shows schematically a view of a trolley track seen from above comprised in a device according to the invention.

FIG. 3b shows schematically a view of a plurality of trolleys movably arranged along a trolley track.

FIG. 4a-e shows schematically a view of a trolley track seen from a couple of angles.

FIG. 6a shows schematically a side view of a second embodiment in a first position.

FIG. 6b shows schematically a side view of a second embodiment in a second position.

FIG. 6c shows schematically a side view of a second embodiment in a third position.

FIG. 9a shows schematically a view of a fourth embodiment according to the invention in a first position.

FIG. 9b shows schematically a view of a fourth embodiment according to the invention in a second position.

FIG. 17b-c shows detailed view of the fork connection device according to FIG. 17a.

DESCRIPTION OF EMBODIMENTS

In the following, a detailed description of the embodiments will be provided.

Figure 1:
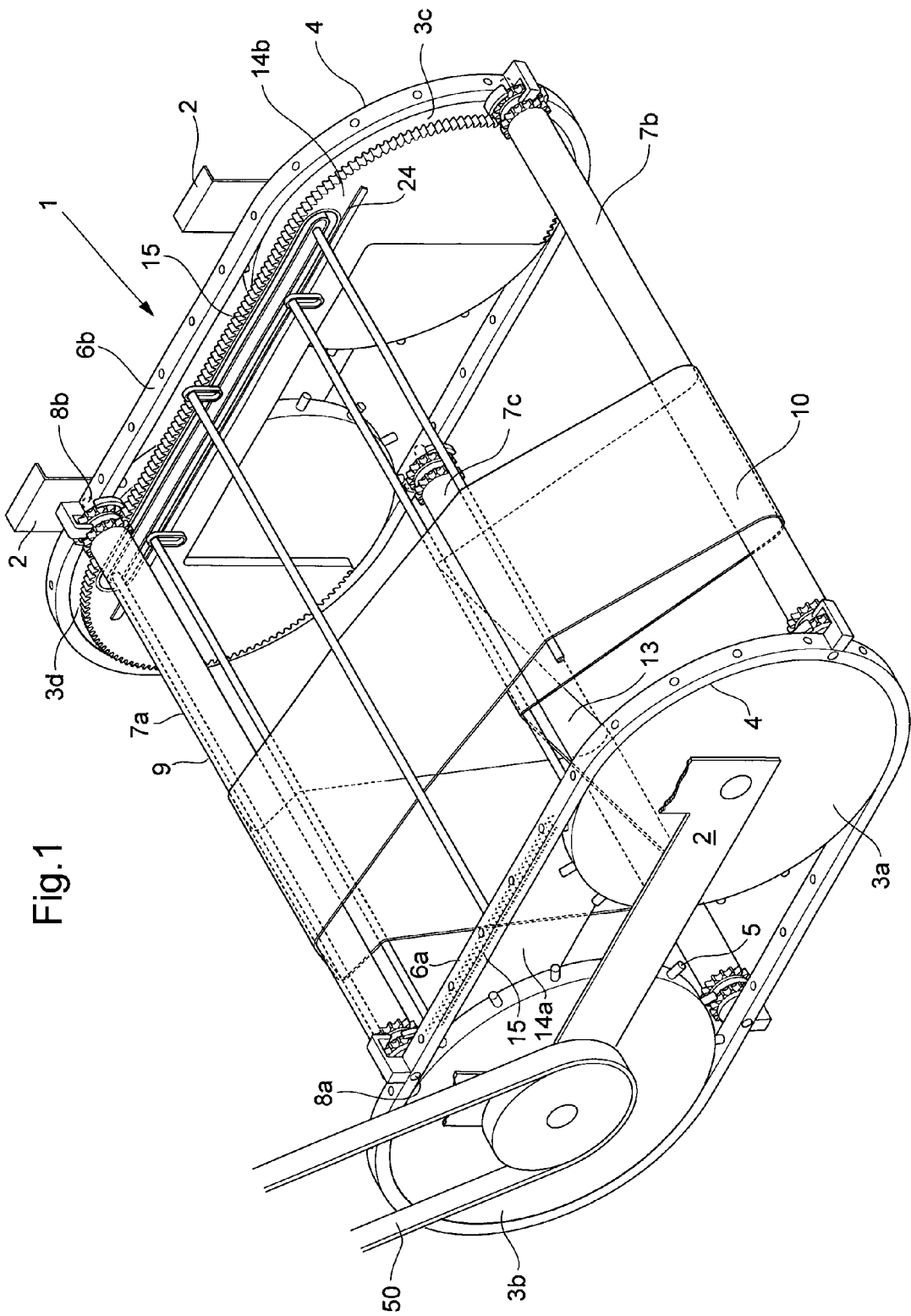
FIG. 1 shows schematically a perspective view of a first embodiment according to the invention.

FIG. 1 shows schematically a perspective view of a first embodiment of the invention according to the invention, wherein the propulsion device 1 comprises a frame 2, four driving wheels 3a-d with a peripheral surface 4 and friction devices 5, which are rotatably arranged in the frame 2. The friction devices according to the Figure are preferably comprised by protrusions, but also other type of friction devices are possible. In the Figure, two of the driving wheels 3a, 3b constitute a first set of driving wheels and the other two driving wheels 3c, 3d parallel to the two driving wheels a second set of driving wheels. A set of driving wheels can comprise one or a plurality of driving wheels. A first track 6a is arranged on the first set of driving wheels such that the track is arranged in contact with the friction devices on the periphery of the driving wheels. A second track 6b is arranged on the second set of driving wheels such that the track is arranged in contact with the friction devices on the periphery of the driving wheels. Other embodiments are possible according to the invention wherein the tracks 6a,b are arranged in contact with the friction devices at a set of driving wheels, for instance by being arranged in contact with the friction devices on the periphery of the driving wheel essentially from the side. A driving belt 50 is arranged with a type of friction device around an axis of a driving wheel 3b of the first set of driving wheels with the purpose of bringing the driving wheels to rotate by transmission from for instance a motor device. A second driving belt of the same type may as needed be placed on a second driving wheel belonging to the second set of driving wheels. The contact between the tracks and friction devices makes the tracks move with the same speed as the periphery of the driving wheels, where the tracks are in contact with the friction devices, when the driving wheels rotate. Three shovel rollers 7a, 7b, 7c each having a first end 8a and a second end 8b and between the ends a preferably cylinder-shaped device with an outer periphery 9 are rotatably arranged in the tracks by that the first ends of the shovel rollers are rotatably arranged in the first track and the second ends are rotatably arranged in the second track. Rotatably arranging of the shovel rollers 7a, 7b, 7c in the tracks 6a, 6b is possible by for instance a relative rotation between the ends 8a, 8b of the shovel rollers in the tracks or by that the ends are fixedly arranged in the tracks and a ball-bearing device (not shown) between the shovel rollers and the ends of the shovel rollers. The device of the shovel rollers between the first and second ends can be of other shape than a cylinder-shape. The attachment of the shovel rollers to the tracks and the contact between the tracks and the driving wheels make the shovel rollers move with the tracks around the driving wheels in relation to the structure when the driving wheels are brought to rotate. The device further comprises a flat, i.e. in relation to its width thin, carpet-like device 10 which is continuous, i.e. lacks ends in a first direction, but has side-ends in a second direction perpendicular to the first direction. The carpet-like device is located between the first and second set of driving wheels and rests on or abuts or contacts the outer periphery of the shovel rollers. For clarity a full-size version of the carpet-like device 10 is not shown in FIG. 1. In connection to and along the side-ends 11 in a first direction of the entire carpet-like device are meshing devices 12 arranged, see FIG. 2a. The carpet-like 10 is of such length that, when abutting the periphery of the shovel rollers between the driving wheels between two of the shovel rollers it can form a shovel by a shovel surface 13, for instance when a mass of water fills the volume between two shovel rollers when the entire device is arranged under the water level. In FIG. 1 this shovel is formed between shovel rollers 7b and 7c. The formed shovel will thus move together with the two shovel rollers 7b, 7c when the shovel rollers move in relation to the frame 2. As is shown in FIG. 1 the propulsion device 1 further comprises a first and a second carpet feeding device 14a and 14b, collectively denoted 14, with an outer periphery, respectively arranged on each frame 2 between the first and second set of driving wheels. The carpet feeding devices 14a and 14b comprise a tooth receiving surface 15 along a part-length of the outer periphery of the carpet feeding device 14a, 14b.

Figure 2A:
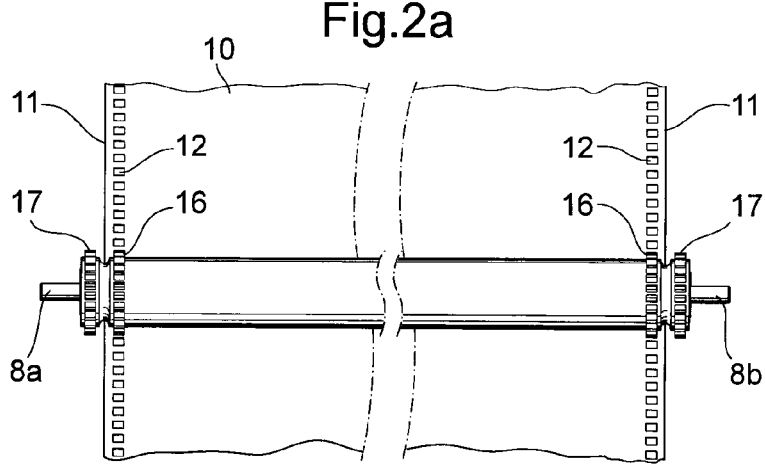
FIG. 2a-d shows schematically four views of a shovel roller comprised in a device according to the invention.
Figure 2C:
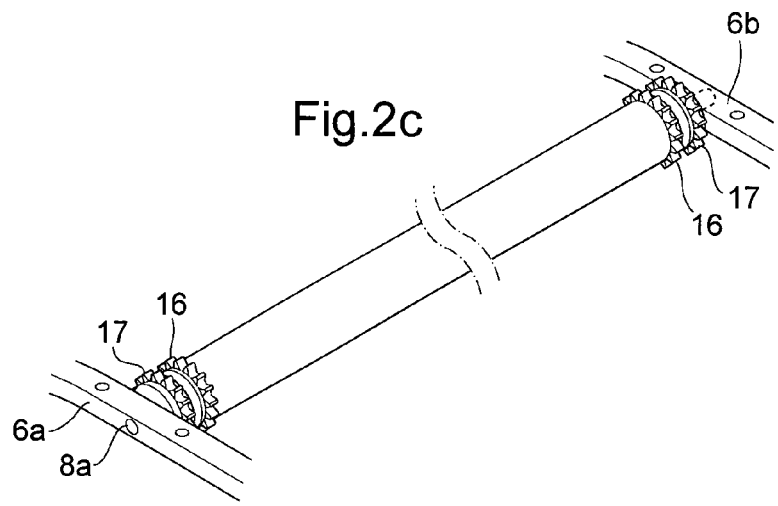
Figure 2B:
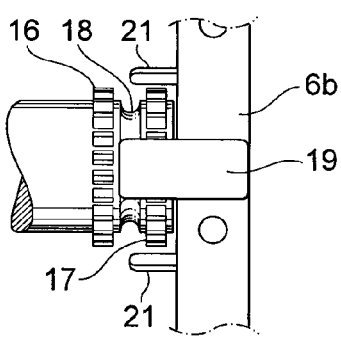
Figure 2D:
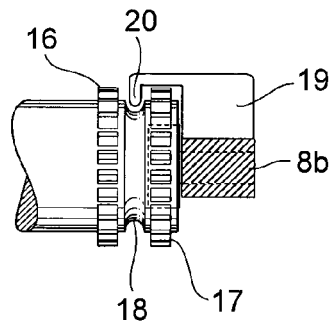

FIG. 2a-2b shows schematically an end section of a shovel roller 7, seen from the side of the shovel roller, perpendicular to the extension direction of the shovel roller radially to the center of rotation of the essentially cylinder-shaped shovel roller, together with a carpet-like device 10. As seen in the Figure the shovel roller comprises an end 8a which is arranged in the track 6a, such that at least the central, essentially cylinder-shaped, part of the shovel roller can rotate in relation to the tracks. The essentially cylinder-shaped device of the shovel roller further comprises a friction device 16 arranged close to the end 8a of the shovel roller and on the outer periphery of the roller, aimed at meshing with the with the friction bodies 12 of the carpet-like device. Through this, the carpet-like device will move with the same speed as a point on the outer periphery of the shovel rollers where the friction bodies 12 of the carpet-like device is arranged in contact with the friction device 16 when the shovel rollers 7a, 7b, 7c are brought to rotate in relation to the tracks 6a, 6b. The shovel roller further comprises a tooth device 17, this device also placed close to the end 8a, 8b of the shovel roller and on the outer periphery 9 of the roller. The tooth device 17 is arranged such that it meshes with the tooth receiving surfaces 15, such that the shovel roller are brought to rotate when the shovel rollers move in relation to the frame 2 along a part-length of the carpet feeding device 14a, 14b outer periphery. Between the tooth device 17 and the friction device 16 a notch 18 has been arranged such that the cylinder-shaped device has a radius which is smaller in the bottom of the notch than at its outer periphery. The carpet-like device 10 can be arranged with a wire device (not shown) along its side-ends which abuts or contacts the bottom of the notch 18. On the tracks 6a, 6b essentially at points in the axial extensions of the shovel rollers carpet holding devices 19 are fixedly arranged to hold the carpet-like device in place against the outer periphery of the shovel rollers in a radial direction. This is achieved by directing a protruding portion 20 of the carpet holding device 19 towards the notch 18 in the shovel roller such that a portion of the carpet-like device, preferably its wire device, is located between the protruding portion 20 of the carpet holding device and the notch 18 in the shovel roller. FIG. 2b, 2d shows the shovel roller from above and from the side perpendicular to the rotation centre of the shovel roller. FIG. 2b shows two driving devices 21 fixedly arranged in the track 6b in close connection to and on each side of the attachment of the shovel roller to the track.

FIG. 3a shows schematically a view of a first trolley track seen from above. A trolley track 22 is arranged along a notched surface 23a on the first carpet feeding device 14a, and analogously along a notched surface 23b on the second carpet feeding device 14b. It is recognized that other, analogous embodiments are possible within the scope of the invention, for instance the carpet feeding devices and the trolley tracks may be arranged in a separate base plate (not shown) instead of being shaped in one piece of carpet feeding device with a notch as described above. An edge 24 of the notched surface is arranged to abut and follow a straight section 25 of a first side 46 of the trolley track 22. The trolley tracks 22 are further arranged between the first and second set of rotating driving wheels as disclosed in FIG. 1. The trolley track 22 has a first end 26 and a second end 27, essentially formed as half-circles with sections 25 there between which is essentially straight. The trolley track 22 further comprises an inner track 28 and an outer track 29, see FIG. 3b.

FIG. 4a-e shows schematically views of a trolley 30 seen from a number of angles. The trolley 30 comprises a first trolley wall 31 and a second trolley wall 32. Between the first and the second trolley wall two roller bearings 33 are arranged in a line, and on the first trolley wall a slide mount 34 is arranged. The slide mount 34 comprises a first end 35 and a second end 36 essentially shaped as half-circles but could also be shaped in other forms, and there between an essentially straight section 37 and where the slide mount has an inner surface 38 and an outer surface 39, see FIG. 4c. The slide mount 34 further comprises a first side surface 40 and a second side surface 41 and is fixedly arranged on the first trolley wall 31 in a first end 35 and first side surface 40, see FIG. 4d. The figures shows further an essentially cylinder-shaped inner shovel roller 42 whose end is slidably arranged in the inner surface 38 of the slide mount 34 such that one inner shovel roller 42 is arranged per slide mount 34 and can be moved between the both ends of the slide mounts. On the inner circular end surfaces 43 of the inner shovel rollers, roller bearings 44 are arranged around which the inner shovel rollers are allowed to rotate, see FIG. 4e. The roller bearings 44 are arranged such that they extend from the first side surface 40 of the slide mount. A notch 45 in the first trolley wall 31 can house the inner shovel roller when it is positioned in its first end 35. FIG. 4d shows an inner shovel roller carpet holder 66 which is rotatably arranged around the inner shovel roller 42. Analogously with the carpet holding device 19 the purpose of this holder is to hold the carpet-like device in place against the periphery of the inner shovel roller 42. A shaping 67 of the inner shovel roller carpet holder 66 locks by gripping a wire device 68 of the carpet-like device 10 the latter in two dimensions, but allows movement in the third dimension.

A plurality of trolleys 30 are movably arranged in the trolley track 22 according to FIG. 3b to follow the trolley track by rolling friction by the aid of the roller bearings 33. The trolleys 30 are arranged in the trolley track 22 such that the two roller bearings 33 are located between the inner track 28 and the outer track 29. The two roller bearings 33 located on a line between the trolley walls prevent rotation of the trolley 30 in relation to the trolley track 22 and enables that the second end 36 of the slide mount 34 always has an extension direction perpendicular from the trolley track regardless of its placement along the trolley track. The inner shovel rollers have such length that they extend from slide mounts arranged in a trolley track 22 on the first carpet feeding device 14a to parallel slide mounts arranged analogously in a trolley track 22 on the other carpet feeding device 14b. What is described below concerning the technical design of the inherent parts and their movements thus take places analogously on both sides, i.e. in connection to both the first and the second set of rotatable driving wheels. FIG. 3b shows further a stop edge comprised by the edge of the carpet feeding device notch surfaces 23a, 23b. The inner shovel rollers 42 are forced to be in a position corresponding to the first end 35 of the slide mount by the stop edge 24 when the trolley 30 moves along the first side 46 of the trolley track. The roller bearings 44 enable rolling friction between the inner shovel rollers 42 and the stop edge which reduces the total friction during this movement. When the trolley 30 moves along the second side 47 of the trolley track the stop edge is missing and the trolley track is allowed to be in a position between the first end 35 and the second 36 of the slide mount 34. When the trolley 30 moves along the end 26 of the trolley track such that the trolley 30 moves from the first side 46 of the trolley track to the second side 47 of the trolley track the inner shovel roller 42 is allowed to move from a position corresponding to first end 35 of the slide mount to the second end 36 of the slide mount and when the trolley moves from the second side 47 of the trolley track to the first side 46 of the trolley track the inner shovel roller 42 is forced to to move from a position corresponding to the second end 36 of the slide mount to the first end 35 of the slide mount. A version of the of the stop edge 24 can have rounded edges (not shown), corresponding to a circular sector part with a radius slightly larger than the ends of the trolley track, to reduce the friction and facilitate the movements of the inner shovel roller between the ends of the slide mounts. Inside the inner track 28 at positions corresponding to the ends 26, 27 of the trolley track, frame roller fasteners 48 are arranged. On the frame roller fasteners 48, essentially cylinder-shaped frame rollers 49 are arranged which extends from a first frame roller fastener 48 arranged inside a trolley track arranged on a first carpet feeding device 14a to a frame roller fastener 48 arranged inside a trolley track 22 arranged on a second carpet feeding device 14b. To reduce the friction when the carpet like device passes the frame rollers, these may preferably be rotatably arranged in the arms attached to the frame roller fasteners.

Figure 5A:
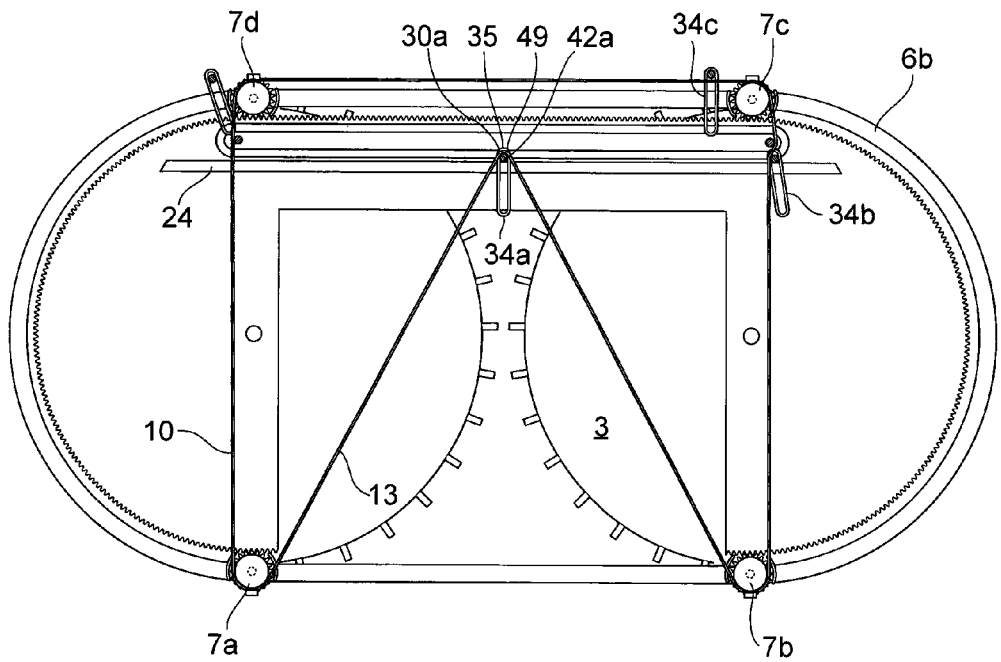
FIG. 5a shows schematically a side view of a first embodiment in a first position.

FIG. 5a shows schematically a cross-section of a first embodiment from the side. This embodiment thus comprises two sets of driving wheels of two driving wheels 3, each rotatably arranged in a frame (not shown), two tracks 6a, 6b four shovel rollers 7a-d and four inner shovel rollers 42a-d. The number of inner shovel rollers may vary depending on the embodiment, but the number should not exceed the number of shovel rollers for an individual device, less than four inner shovel rollers are thus possible for the embodiment according to FIG. 5a. According to the Figure the shovel rollers 7a-d are arranged essentially in the far corners in a thought square shape where the shovel rollers 7a-d stretch out the carpet-like device 10. Between a first shovel roller 7a and a second shovel roller 7b a shovel surface has been formed. According to the Figure, the shovel is created by that the carpet-like device in one point 49 is guided around a first inner shovel roller 42a slidably and rotatably arranged in a first slide mount 34a which in turn is attached to a first trolley 30a, when the first inner shovel roller 42a is held in position corresponding to the first end 35 of the slide mount due to the stop edge 24. When the first inner shovel roller 42a is located in a position in the middle along the first side 46 of the trolley track it is thus held in a position corresponding to first end 35 of the slide mount due to the stop edge 24 with the purpose to create a sufficiently stretched shovel surface 13. It should be recognized that other embodiments are possible where the inner shovel rollers have been removed entirely and where the shovel surface 13 is formed by the pressure from a volume of water (not shown) which presses the carpet-like device 10 between two of the shovel rollers 7a-d.

Figure 5B:
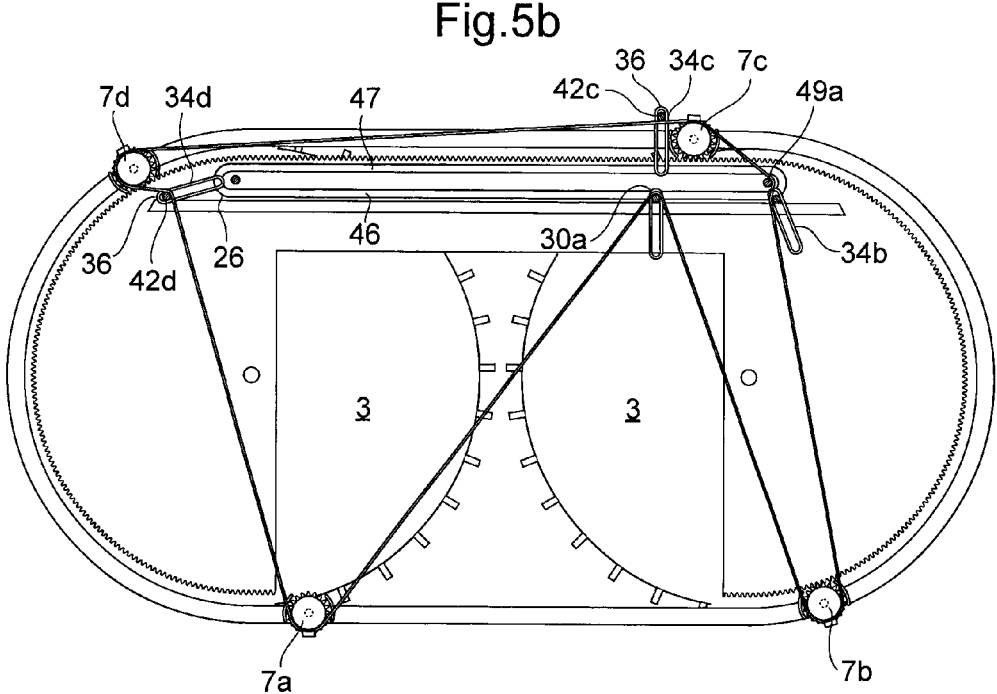
FIG. 5b shows schematically a side view of a first embodiment in a second position.

In FIG. 5b the driving wheels have been brought to rotate in a counterclockwise direction which makes the tracks 6a, 6b and the shovel rollers 7a-d rotatably arranged in the tracks, move in a counterclockwise direction around the driving wheels 3. A second shovel roller 7b is, due to this movement, in a position corresponding to an outer periphery of the driving wheels 3 and thus the tooth device 17 of the shovel roller is located along the teeth receiving surface 15 of the carpet feeding device 14b, such that the tooth device 17 meshes with the tooth receiving surface 15 such that the second shovel roller 7b is brought to rotate and by that the friction device 16 of the shovel roller meshes with the friction body 12 of the carpet-like device 10 the carpet-like device is driven around the second shovel roller 7b. The first trolley 30a has moved a distance along the first side 46 of the trolley track in a counterclockwise direction which by that has made the shovel surface 13 move in a counterclockwise direction. To keep the carpet-like device from collapsing but be kept stretched when it is driven around by the movement of the shovel rollers it has been placed outside, and slidably or alternatively rollingly abutting first frame roller 49a. A third shovel roller 7c has by the movement of the track been moved from a first position to a second position. A driving device 21a fixedly arranged in the track 6b in close connection to and on each side of the attachment of the third shovel roller 7c to the track 6b brings a third sliding mount 34c in front of itself along the second side 47 of the trolley track. As is indicated in the Figure a third inner shovel roller 42c is in a position corresponding to a second end of the slide mount 34c when it has been pressed out by the carpet-like device 10 and not been hindered by any stop edge 24. A fourth shovel roller 7d has been moved to a position corresponding to an outer periphery of the driving wheel 3 and has thus been forced to rotate. A fourth inner shovel roller 42d is in a position corresponding to a second end 36 of a fourth slide mount 34d but is here tangent to stop edge 24. The corresponding fourth trolley 30d in which the fourth slide mount is arranged is thus located at an end 26 of the trolley track 22.

Figure 5C:
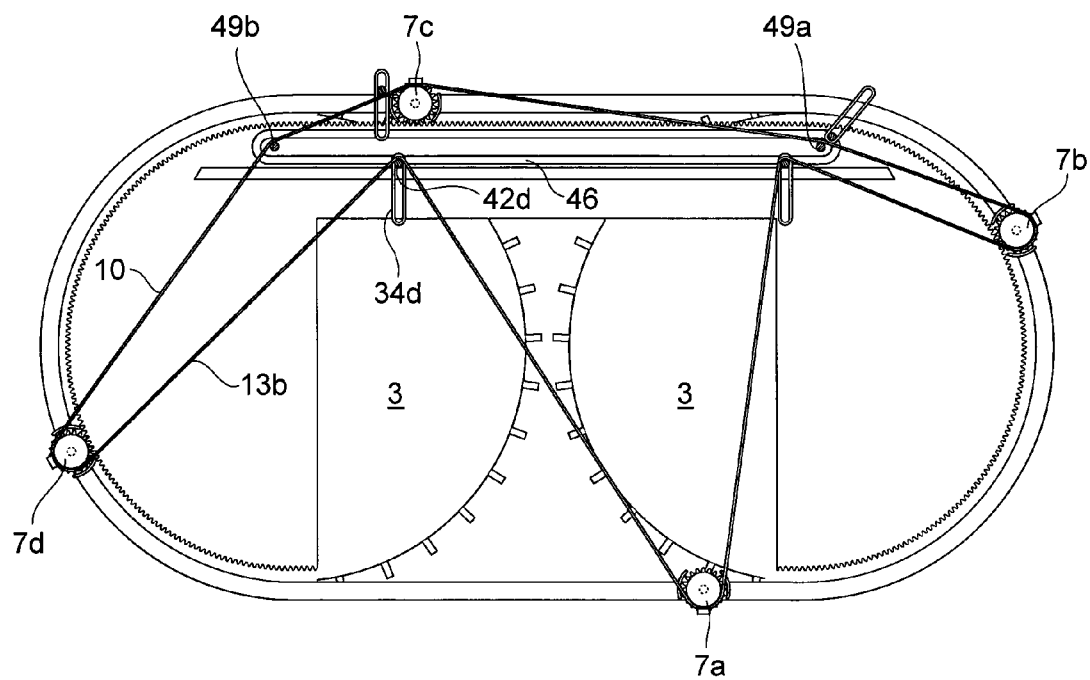
FIG. 5c shows schematically a side view of a first embodiment in a third position.

FIG. 5c shows how the fourth shovel roller 7d has been moved further along an outer periphery of the driving wheel 3 and where the fourth trolley 30d has been moved to a position along the first side 46 of the trolley track. The fourth inner shovel roller 42d is in a position corresponding to a first end 35 of the fourth slide mount 34d due to the stop edge 24, and between the fourth shovel roller 7d and the first shovel roller 7a another shovel surface 13b has thus been formed. The carpet-like device 10 between the third shovel roller and the fourth shovel roller is prevented from collapsing by that it is located outside and slidably abuts a second frame roller 49*b*.

FIG. 6*a* shows schematically a view of a second embodiment of a device according to the invention in a first position. The device comprises two sets of driving wheels 3 of one driving wheel, each rotatably arranged in a frame 2, four shovel rollers 7*a-d* being rotatably arranged in the periphery of the driving wheel in a track 6 integrated with the driving wheel, a carpet feeding device fixedly arranged in the frame having a part-length corresponding to a part of the periphery of the driving wheel 3 arranged with a tooth receiving surface 15, in such manner that at most between two and three shovel rollers 7*a-d* are in a position such that their tooth devices 17 meshes with the tooth receiving surface 15 of the carpet feeding device 14 such that the shovel rollers 7*a-d* are brought to rotate. The Figure shows a first shovel surface 13*a* and a second shovel surface 13*b*.

FIG. 6*b-c* shows schematically side views of the second embodiment in a second and third position where the shovel surfaces are brought to move in relation to the frame 2 when the shovel rollers 7*a-d* move in relation to the structure 2 according to a principle analogous with the one described in FIG. 5*a-c*. In FIG. 6*b* is also shown a third formed shovel surface 13*c* by the movement of the shovel rollers.

Figure 7A:
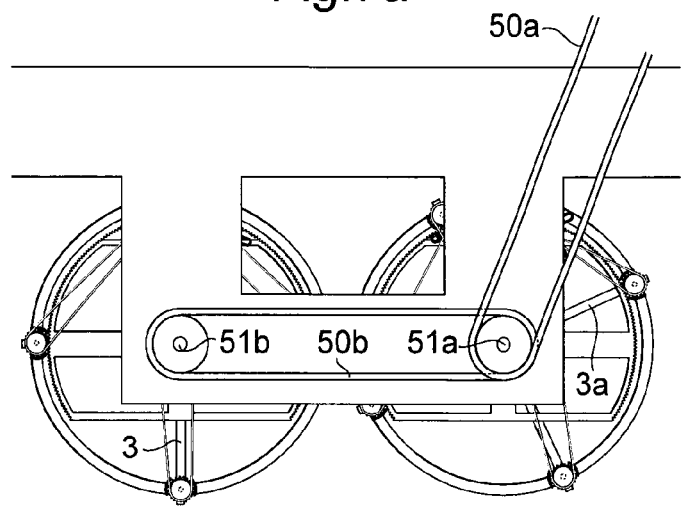
FIG. 7a shows schematically a side view of a second embodiment according to the invention where the driving wheels are connected in series.

FIG. 7*a* shows schematically a view of the second embodiment according to the invention where the driving wheels 3*a,b* are connected in series by the aid of two driving belts 50*a*, 50*b* arranged with a type of friction body and a pair of rotatably arranged axis fixedly arranged in the rotation centre of the driving wheel which have been arranged with complementary friction bodies to mesh with the friction bodies of the driving belts. When the first driving belt 50*a* is activated, i.e. brought to rotate by for instance a motor device or by pedal force, a first driving wheel 3*a* is rotated by the mesh between the friction bodies between the first driving belt 50*a* and a first axis 51*a*. The rotation of the first axis 51*a* will get the second driving belt 50*b* to rotate by the friction bodies between the first axis 51*a* and the second driving belt 50*b*. Finally, the second axis 51*b* and thus the second driving wheel 3*b* are got to rotate by the friction bodies between the second driving belt 50*b* and the second axis 51*b*.

Figure 7B:
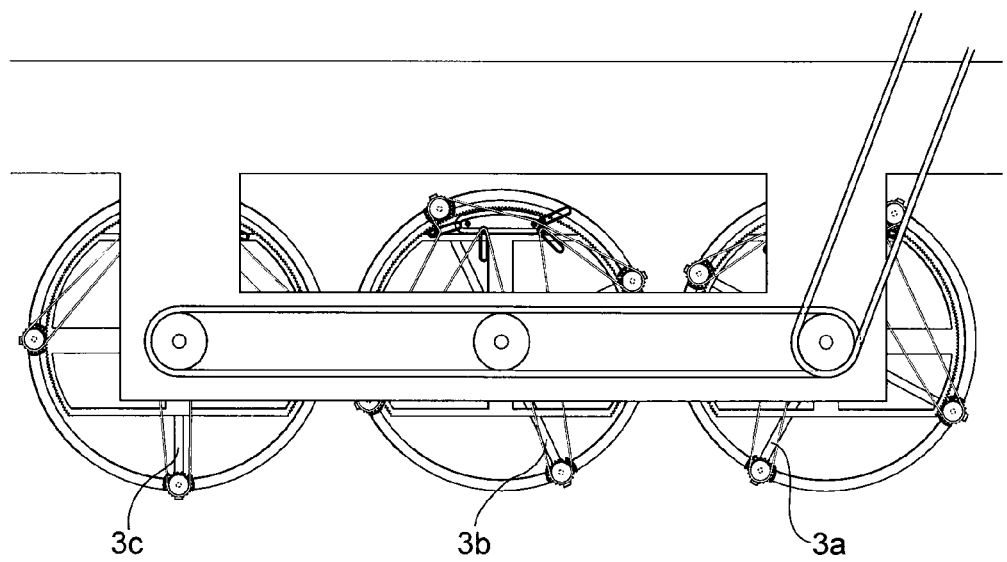
FIG. 7b shows schematically a side view of a second embodiment according to the invention where the driving wheels are connected in series.

FIG. 7*b* shows schematically a view of the second embodiment according to the invention where the driving wheels 3*a-c* are connected in series according to a principle as presented in FIG. 7*a* with the difference that three driving wheels are connected in series.

Figure 8C:
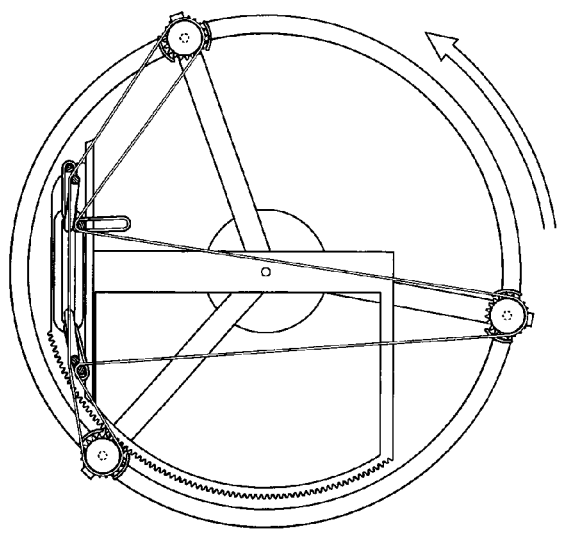
FIG. 8c shows schematically a side view of a third embodiment in a third position.
Figure 8B:
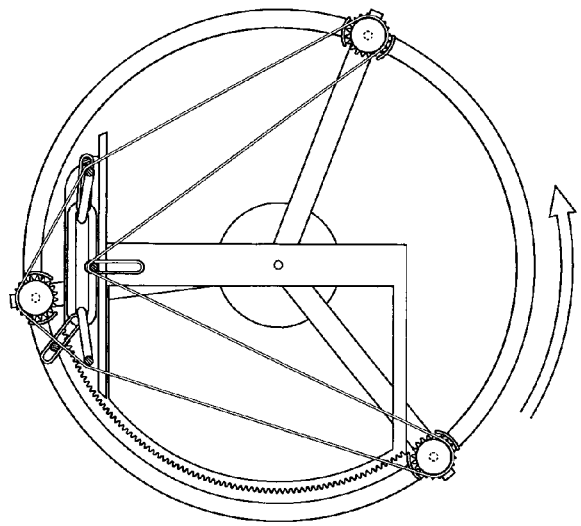
FIG. 8b shows schematically a side view of a third embodiment in a second position.
Figure 8A:
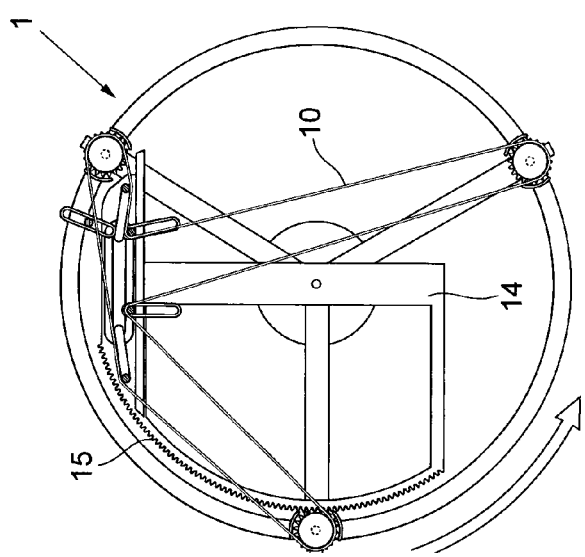
FIG. 8a shows schematically a side view of a third embodiment in a first position.

FIG. 8*a-c* shows schematically a view of a third embodiment according to the invention in a first position to a third position according to a similar description as disclosed in FIG. 6*a-c* but where the tooth receiving surface 15 of the carpet feeding device 14*b* corresponds to between 25-50% of the periphery of the driving wheel. This length is adapted to correspond to the distance where the carpet-like device 10 is shaped to a shovel and is thus minimized to reduce the friction and thus the energy required for driving the device 1. The Figure shows an alternative embodiment of the frame roller fastener, with the purpose to achieve a further improved stretching of the carpet-like device. These essentially cylinder-shaped frame rollers extend, via an arm with an angle for allowing passage of a slide mount between the frame roller and the carpet feeding device, from a first frame roller fastener arranged inside the trolley track arranged on a first carpet feeding device 14*a* via another arm with an angle, to a frame roller fastener arranged inside a trolley track 22 arranged on a second carpet feeding device 14*b*. To reduce the friction when the carpet-like device passes the frame rollers, these may advantageously be rotatably arranged in the arms attached to the frame roller fasteners.

FIG. 9*a* shows schematically a view of a fourth embodiment according to the invention in a first position where the tooth receiving surface of the carpet feeding device 14 corresponds to between 25-50% of the periphery of the driving wheel and where the device 1 comprises two shovel rollers 7*a*, 7*b* and two inner shovel rollers 42*a*, 42*b*. The length of the tooth receiving surface 15 is adapted to correspond to the distance where the carpet-like device 10 is formed to a shovel 13 and is thus minimized to reduce the friction and thus the energy required for driving the device 1. The Figure shows, as the FIGS. 8*a-c* an alternative embodiment of the frame roller fasteners. These essentially cylinder-shaped frame rollers extend, visa an arm with an angle for allowing passage of a slide mount between the frame roller and the carpet feeding device, from a first frame roller fastener arranged inside the trolley track arranged on a first carpet feeding device 14*a* via another arm with an angle, to a frame roller fastener arranged inside a trolley track 22 arranged on a second carpet feeding device 14*b*. To reduce the friction when the carpet-like device passes the frame rollers, these may advantageously be rotatably arranged in the arms attached to the frame roller fasteners.

FIG. 9*b* shows schematically a view of the fourth embodiment according to the invention in a second position where the tooth receiving surface of the carpet feeding device corresponds to between 25-50% of the periphery of the driving wheel and where the device comprises two shovel rollers and two inner shovel rollers. The length of the tooth receiving surface is adapted to correspond to the distance where the carpet-like device is formed to a shovel and is thus minimized to reduce the friction and thus the energy required for driving the device.

Figure 10A:
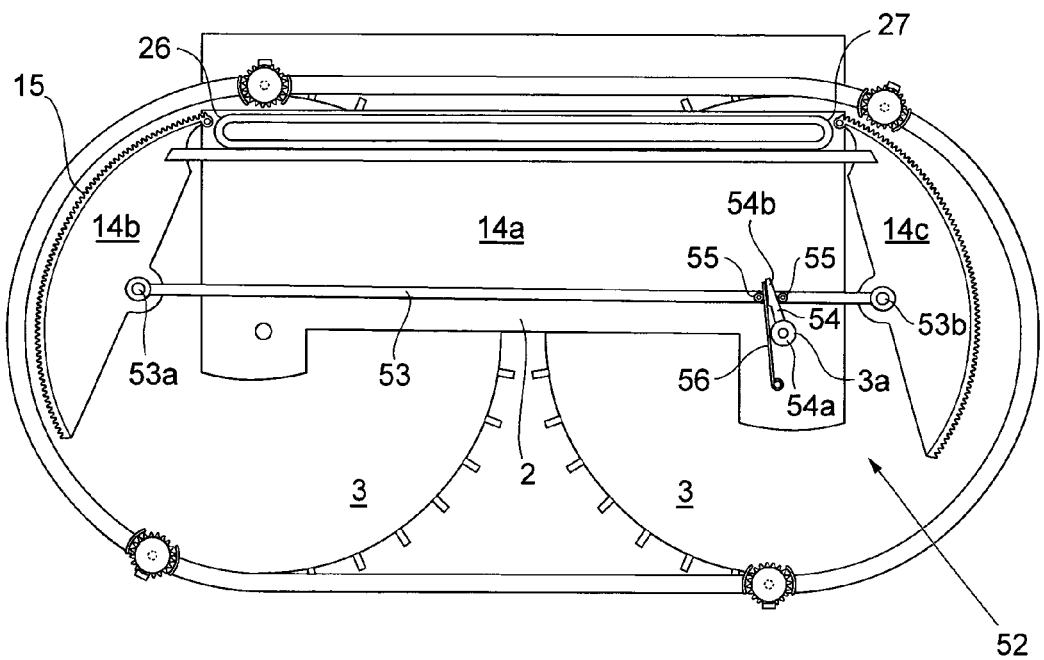
FIG. 10a shows a gear shift device comprised in a device according to the invention.

FIG. 10*a* shows a gear shift device 52 which purpose is to reduce the friction of the device 1 and thus the energy required for driving the same. The example in FIG. 10*a* shows an embodiment comprising two driving wheels 3 on one side of the device 1, but where the gears shift device 52 further comprises a carpet feeding device 14 consisting of an inner fixed carpet feeding portion 14*a*, placed essentially parallel with the straight section 25 of the trolley track and two outer movable carpet feeding portions 14*b*, 14*c*, essentially placed on each side of the inner carpet feeding portion 14*a*. The first outer carpet feeding portion 14*b* is rotatably arranged at a point close to the first end 26 of the trolley track, and the second outer carpet feeding portion is rotatably arranged at a point close to the second end 27 of the trolley track—The outer carpet feeding portions 14*b*, 14*c* are connected by an axis 53, which is, in its first end 53*a*, rotatably arranged in the first outer carpet feeding portion 14*b* and in its second end 53*b* rotatably arranged in the second outer carpet feeding portion 14*c*. A gear changer 54 is rotatably arranged in a first end 54*a* in the inner carpet feeding device 14*a*, preferably in a rotation centre 3*a* of one of the driving wheels and in this case rotatably arranged in the frame 2 of the device. The second end 54*b* of the gear changer 54 is arranged outside the axis 53 and between two cylinder-shaped stop devices 55 of the axis 53. The second end 54*b* of the gear changer 54 is slidably arranged along the outer periphery o of the stop devices 55 such that rotation of the gear changer is transmitted to a linear movement of the axis 53. In one embodiment, a tension spring 56 is arranged in the second end of the gear changer 54*b* and in the inner carpet feeding device 14*a* such that a force is required to stretch the spring 56 corresponding to a position of the gear changer where its second end 54*b* is in an essentially vertical position and such that the gear changer 54 shall be pre-tensioned towards to any of its two outer positions, i.e. where the gear changer has rotated maximally to either direction. A gear shift wire, preferably of Bowden cable type, is arranged in the second end of the gear changer 54b (not shown). The gear shift wire is connected to an actuation device (not shown) close to the operator such that he can activate the gear shift device 52. Activation of the gear shift device 52 implies that the gear changer 54 is a allowed to rotate from a first outer position to a second outer position. When the gear changer is in its first outer position as is shown in FIG. 10 the second end 54b of the gear changer presses the left stop device 55 of the axis 53 to the left and thus the axis to the left, such that the axis by being connected to the second outer carpet feeding portion 14b presses also this in the same direction. In this position the tooth device 17 of a passing shovel roller is allowed to mesh with the tooth receiving surface 15 of the first outer carpet feeding portion 14b, but not in the second outer carpet feeding portion 14c. Therewith a gear shift device 52 has been achieved wherein the total friction can be adjusted. Analogously the operator may, by activating the actuation device, get the gear changer 54 to rotate to its second outer position and thereby allow the tooth device 17 of a passing shovel roller to mesh with the tooth receiving surfaces 15 of the first carpet feeding device 14c but not with the first carpet feeding device 14b.

Figure 10B:
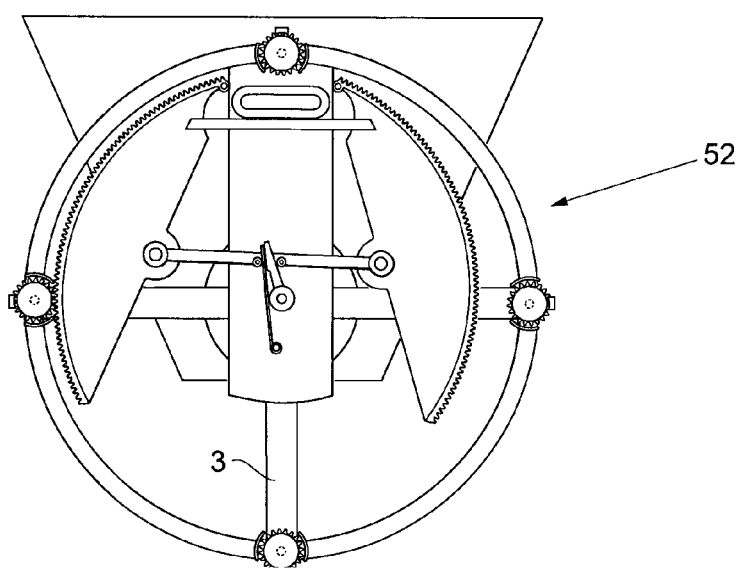
FIG. 10b shows a gear shift device comprised in a device according to the invention.

FIG. 10b shows a gear shift device according to the invention in one embodiment with only one driving wheel 3. The principle is the same as described for the embodiment according to FIG. 10a.

Figure 11A:
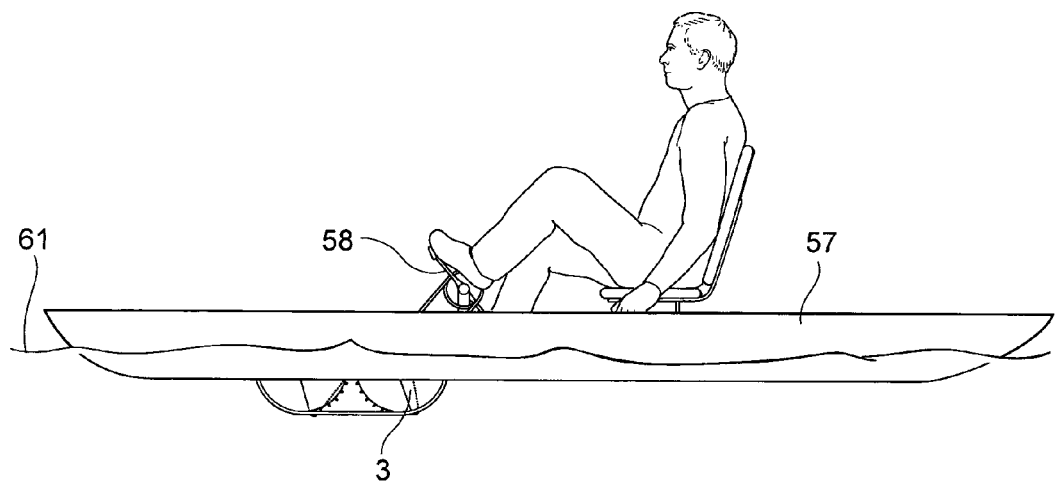
FIGS. 11a and 11b shows schematically a side view and a plan view of a craft equipped with a propulsion device according to the invention.
Figure 11B:
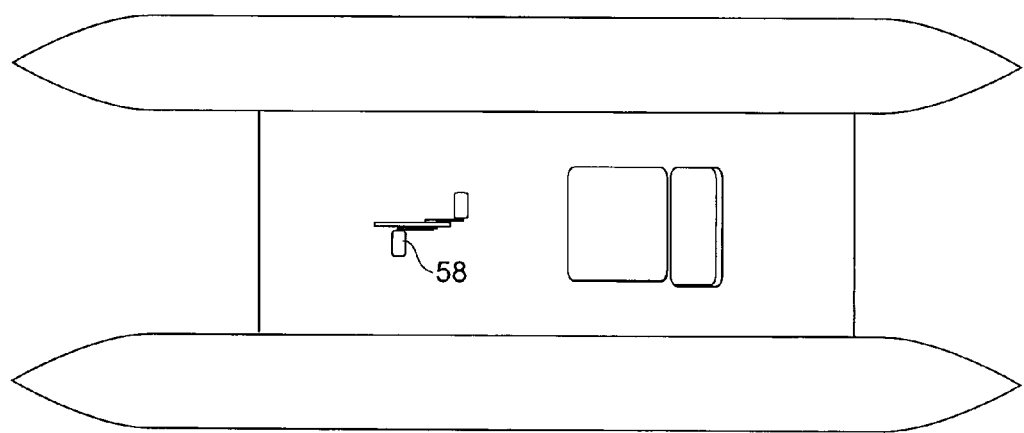

FIG. 11a, b shows schematically a view of a craft 57 equipped with a propulsion device 1 according to the invention. As disclosed in the Figure the device may be placed in its entirety below the water level 61 under the craft and be connected to a driving device 58 consisting of for instance a motor or a pedal device mechanically arranged to rotate one or several driving wheels 3. As is evident, the present problem defined in the Background is hereby solved in this text, i.e. that the shovel wheel must be placed to a large extent above the water level. It should be realized that this craft can be brought from a water environment to a land environment since the device by its tracks 6 can drive the craft according to the same principle to that of a tracked vehicle. The inner shovel rollers that contribute to creating a shovel surface of the carpet-like device 10 fills an important purpose when the craft 57 is travelling on land, wherein the shovel surface no longer can be held in place by the water pressure but this section of the carpet-like device would lag behind the craft and constitute a severe hindrance for driving of the same.

Figure 12:
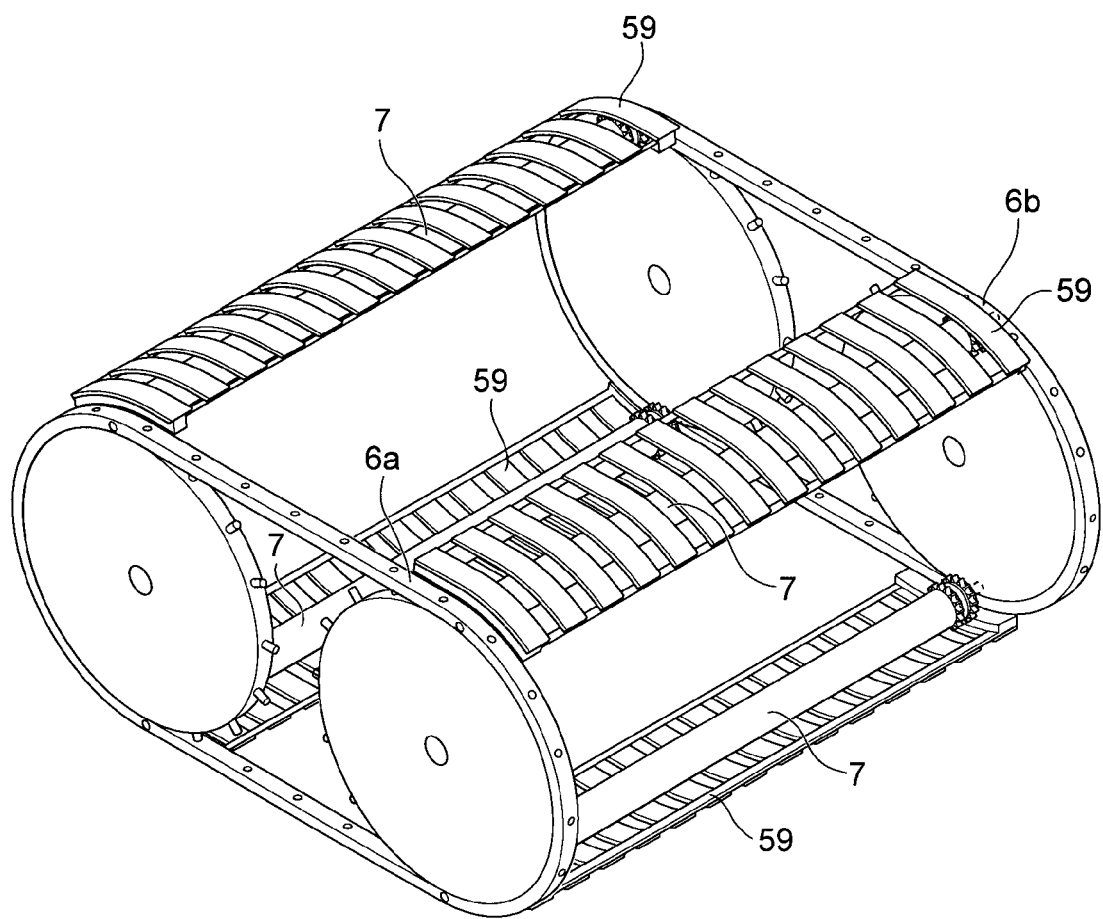
FIG. 12 shows a carpet protection device comprised in a device according to the invention.

FIG. 12 shows a ground protection device 59 for a device according to the invention. To protect the shovel rollers 7 and the carpet-like device 10 by driving on land a plurality of ground protection devices consisting of a flexible material such as plastic be arranged in the tracks and extend from the first track 6a to the second track 6b at a point in the tracks outside the respective shovel roller 7 such that a part of the carpet-like device 10 is between the shovel roller 7 and the ground protection device 59. These can be formed with a varying length in the direction of the craft but it should be ensured that these are not made too long and preferably are arranged with openings for passage of a sufficiently large volume of water to fill the shovels.

Figure 13A:
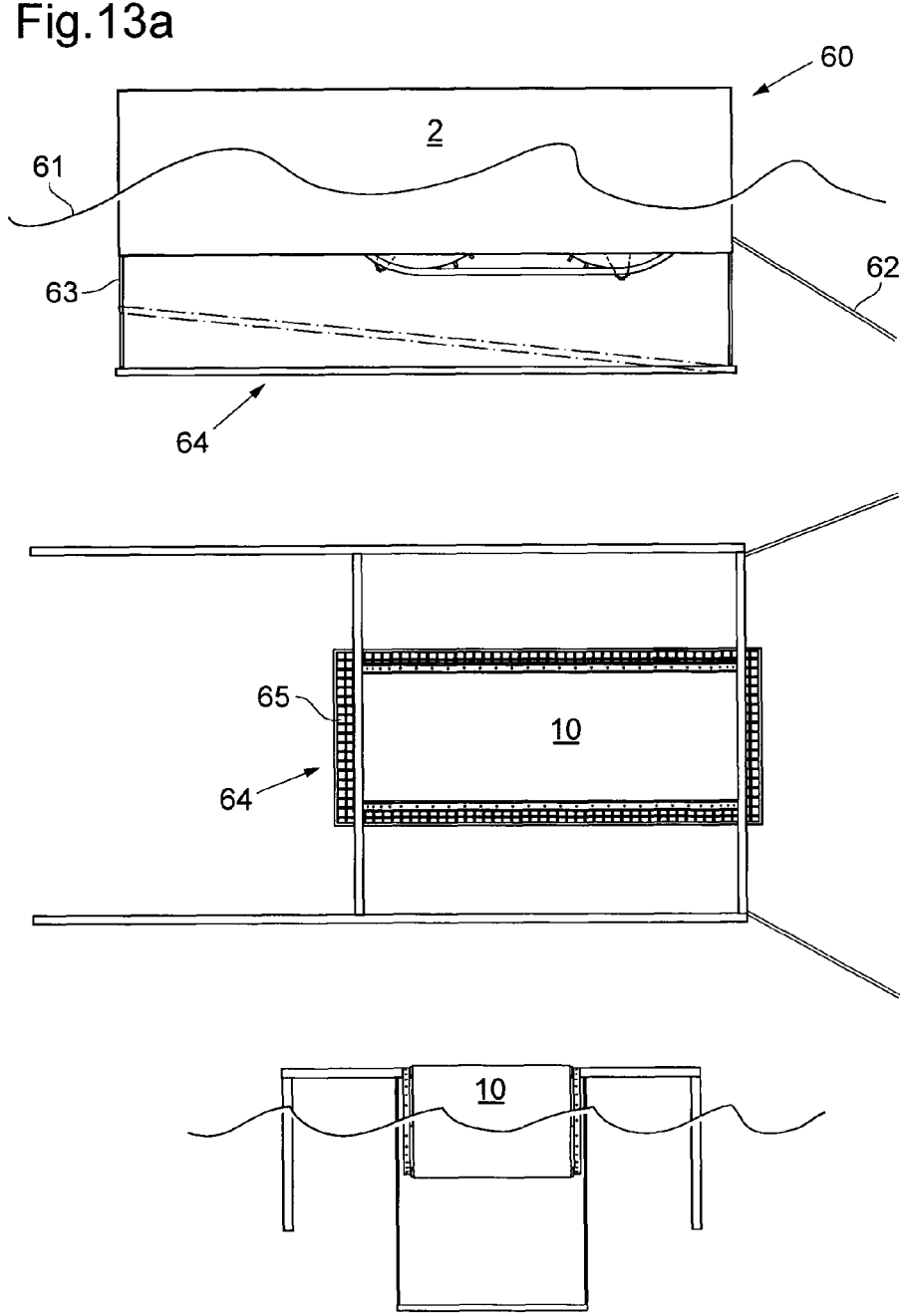
FIG. 13a-b shows schematically a picture of an energy production device according to the invention.
Figure 13B:
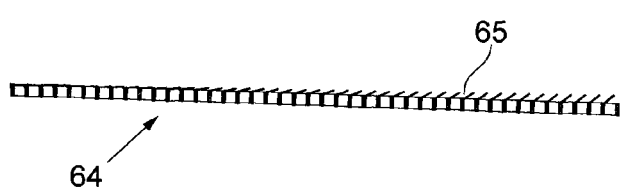

FIG. 13a-b shows schematically a picture of a energy production device 60 according to the invention designed as a propulsion device as described with reference to FIG. 1-12. The device according to the Figure is arranged partly over and partly below the water level 61 to generate energy from waves. It should be understood that the device also can be used for generating energy from flowing water and thus be placed in its entirety below the water level 61 or in a pipe with flowing water alternatively in its entirety above the water level to work as a wind power plant. In one embodiment the gear shift device as described in [0050] can be activated by changes in the direction of the flowing water, for instance a vane-like device fixedly arranged to the gear changer 54 turn after the flow direction and thus turn the gear changer 54 to any of its outer positions such that the friction is minimized and the efficiency of the energy production device is maximized as described above. FIG. 13a shows a side portion 2 or a frame wherein the driving wheels are rotatably arranged. The side portion 2 is anchored to the seabed via a anchor line 62. A lateral brace 63 running from the side portion holds a wave dampening device 64, individually shown in FIG. 13b, consisting of a large rectangular surface comprising a large number of closable hatches 65 placed in a mesh-grid over the propagation surface of the wave dampening device. The purpose of the wave dampening device is to continuously hold a part of the device below the water level, especially when to wave passes to increase the efficiency of the device or to prevent strongly flowing water from lifting the device above the water level. The closed hatches forces the device to remain below the water level even as a passing wave wants to lift the same, and allows the device to press down as the wave has passed by that water is allowed to flow through the hatches which thereby opens. The entire device can also be made rotatably suspended in, and in relation to the side portion to be quickly turned at changed weather conditions and directions of flowing water and waves to further increase the efficiency of the device 60.

Figure 14A:
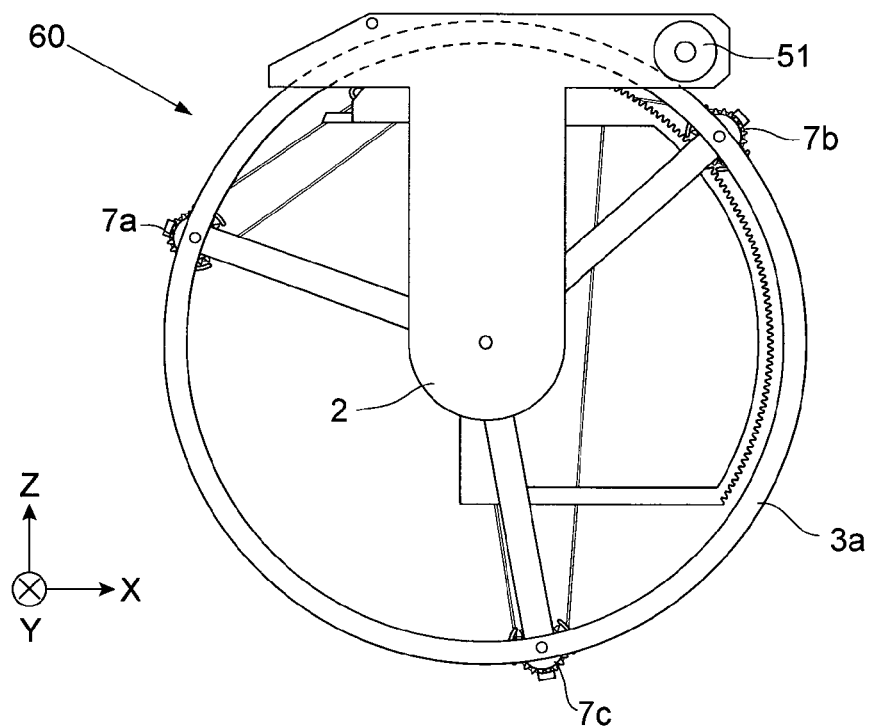
FIG. 14a shows a side view of another embodiment of an energy production device.
Figure 14B:
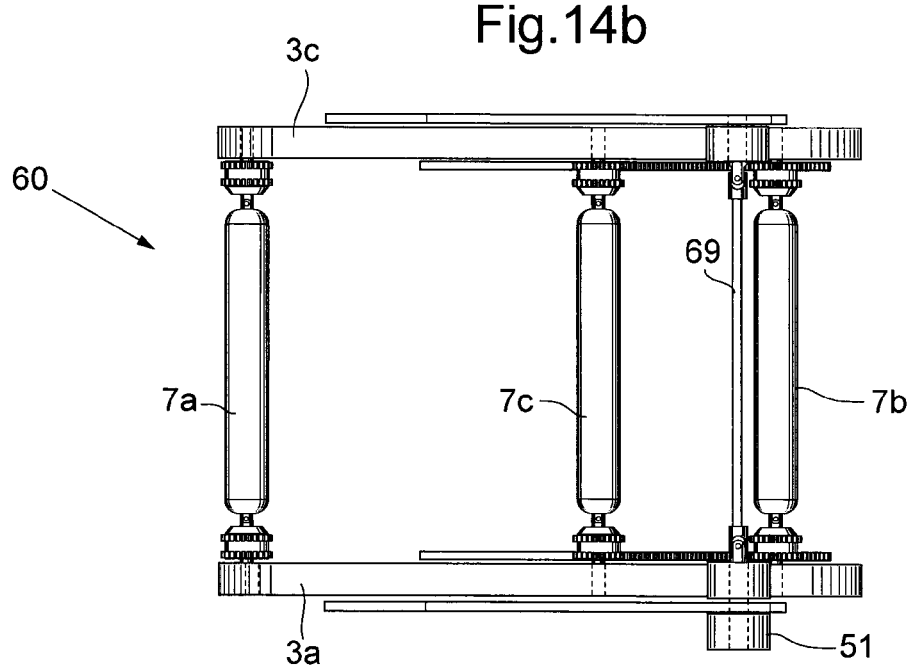
FIG. 14b shows the energy production device of FIG. 14a from above.

FIG. 14a shows a side view of another embodiment of an energy production device 60 according to the invention wherein it is possible to optimize the direction of the device 60, i.e. the shovel surface 13 or correspondingly the extension direction of the shovel rollers 7a, 7b, 7c (axial direction of shovel rollers), in relation to the direction of incident flowing water or waves. An adjusting device (not shown) enables the adjustment of relevant parts of the device 60 in relation to the impinging water. The exemplary embodiment is arranged in a similar manner to the propulsion device according to FIG. 8a comprising two set of driving wheels 3 with one driving wheel each, 3a and 3c respectively rotatably arranged in a structure 2. An optimal direction of incoming flowing water may be separate from perpendicular to the extension direction of the shovel rollers 7a, 7b, 7c, and may include directions such as preferably 0°-90°, and more preferably 45°-90° in relation to the extension direction of the shovel rollers 7a, 7b, 7c and the carpet like device 10 to optimize the output of the device 60 in terms of transforming rotational energy to for instance electrical energy. The incoming water flows in a y-direction according to the coordinate system of FIG. 14a, hence impinges in a direction corresponding to the extension direction of the shovel rollers 7a, 7b, 7c. An axis 51 is connected to a type of friction body that is engageable with outer surface portion of the driving wheel 3a, 3c. i.e the integrated driving track 6, in order to transfer a rotational movement of the driving wheel 3a, 3c to a rotational movement of the axis 51. The axis 51 is connected to for instance a gearwheel and/or to a generator (not shown) for further transforming rotational energy to electrical energy. FIG. 14b shows the energy production device 60 of FIG. 14a from above wherein the flow of water impinges on the energy production device in a direction parallel to the extension direction of the shovel rollers 7.

Figure 14C:
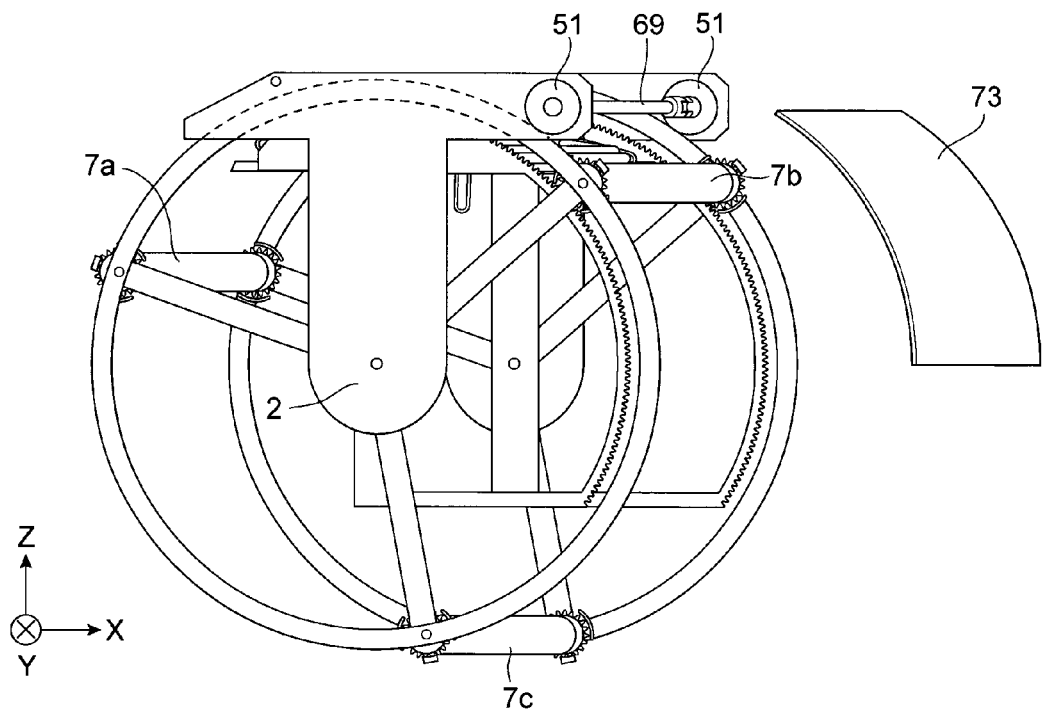
FIG. 14c shows a side view of FIG. 14a wherein the set of driving wheels are parallel shifted.
Figure 14D:
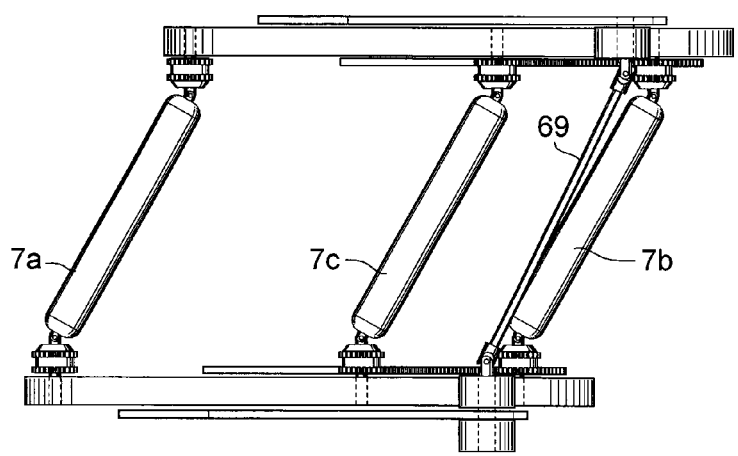
FIG. 14d shows the energy production device of FIG. 14c from above.
Figure 15A:
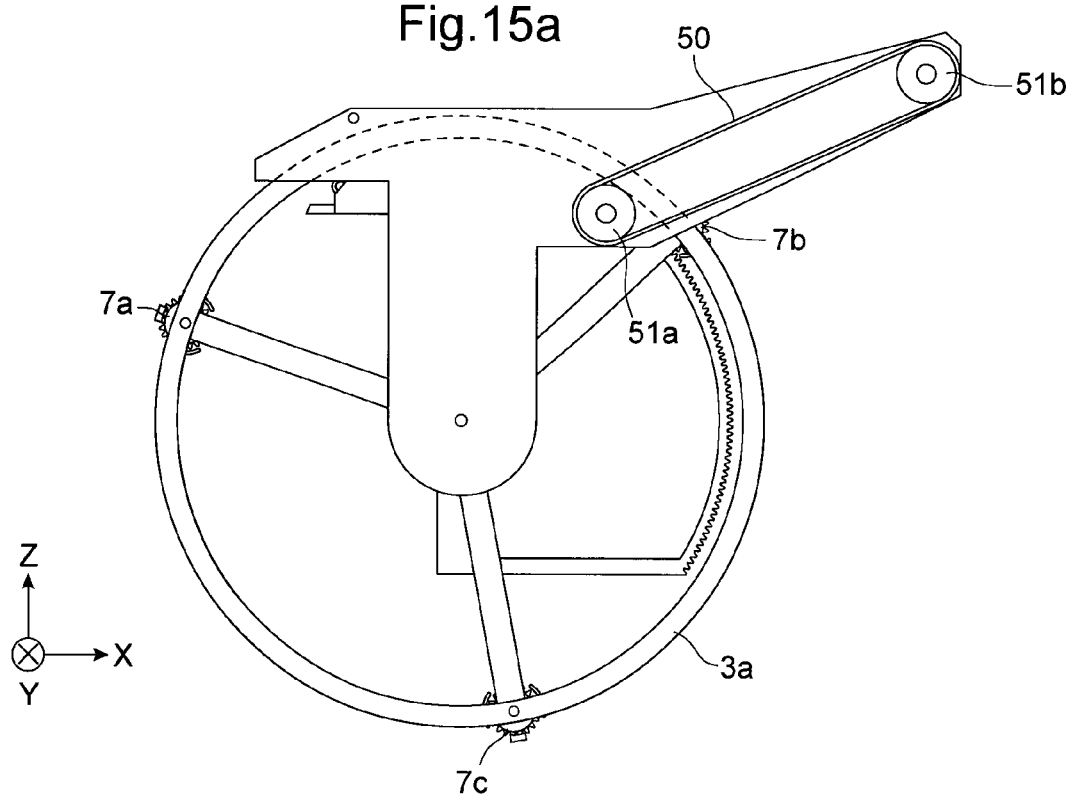
FIG. 15a shows a side view of yet another embodiment of an energy production device.
Figure 15B:
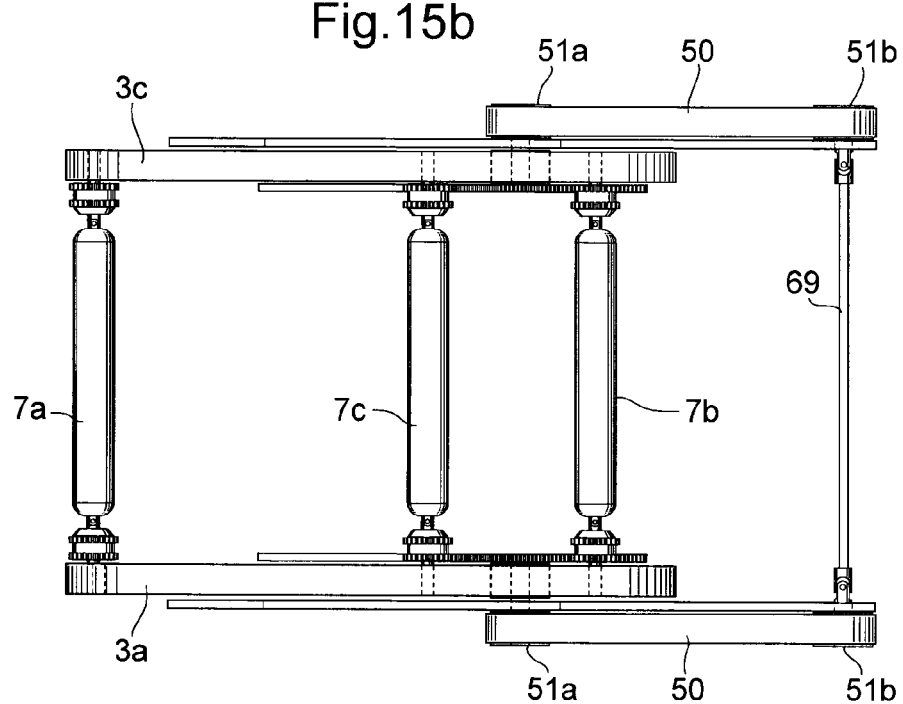
FIG. 15b shows the energy production device of FIG. 15a from above.
Figure 15C:
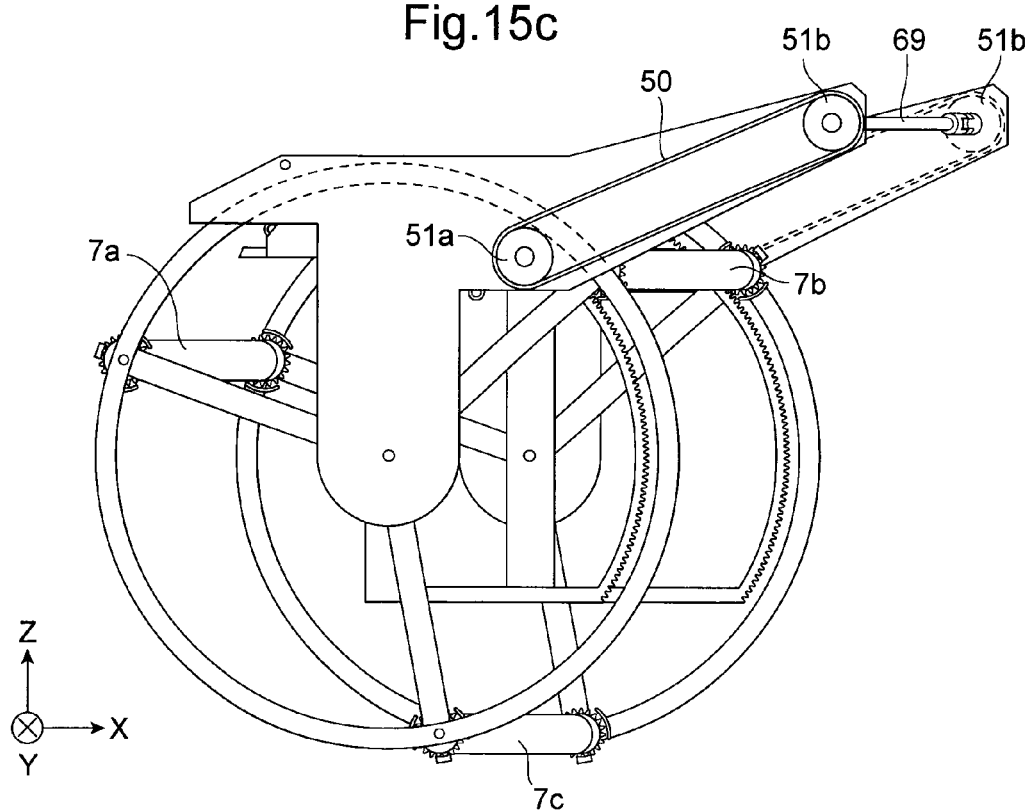
FIG. 15c shows a side view of FIG. 15a wherein the set of driving wheels are parallel shifted.
Figure 15D:
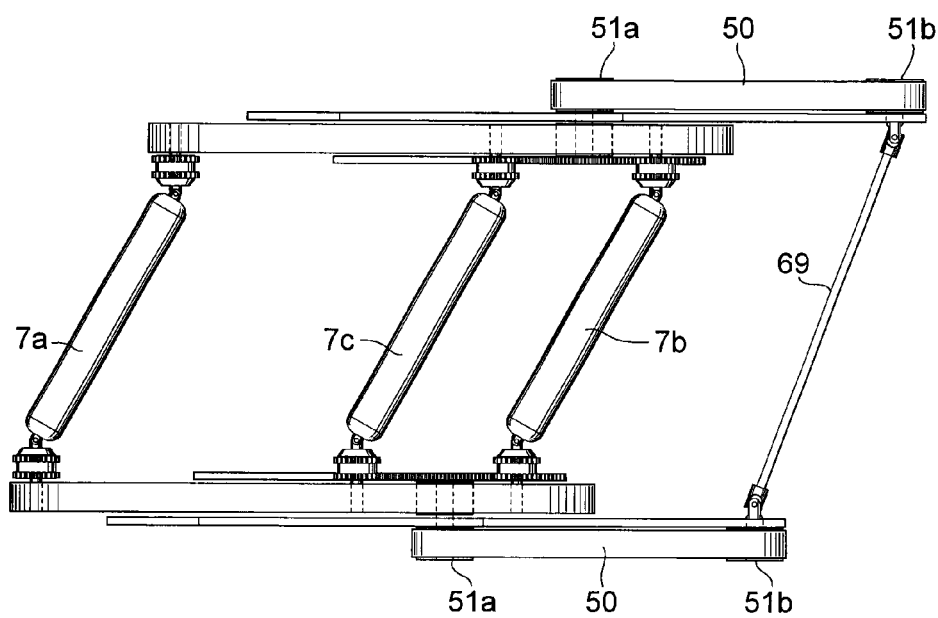
FIG. 15d shows the energy production device of FIG. 15c from above.

FIG. 14c shows the energy storage device of FIG. 14a in a second position wherein the direction of the device in relation to the flow of water is improved by being adjusted. The flow of water is flowing in a y-direction according to the coordinate system of FIG. 14c, similar to FIG. 14a-b. The two set of driving wheels 3 have been adjusted by being parallel shifted, i.e. such that the incident water now impinges the extension direction of the shovel rollers in a direction <90°, wherein FIG. 14c shows an incidence angle of essentially 45°. Further, FIG. 14c shows one embodiment of a flow shielding device 73 which can be arranged on the device, for instance in the frame 2 (not shown), in order to prevent the water flow from impinging on the shovel surface 13 above the rotational axis of the set of driving wheels. Such flowing water is namely contra-productive since it tends to force the driving wheels 3a, 3c to rotate in a counterclockwise direction according to FIG. 14c. Analogously to FIG. 14b, FIG. 14d shows the energy production device 60 of FIG. 14c from above wherein the flow of water impinges on the energy production device in a direction non-parallel to the extension direction shovel rollers 7. Between, and connecting the axis 51 of the set of driving wheels 3a, 3c, a driving axis 69 is arranged to connect the two set of driving wheels 3 and to control the rotational speed of the driving wheel 3a and 3c respectively, such that their speed are similar which minimizes internal friction and optimizes the device 60 ability for energy transformation. Further, only one generator needs to be arranged in the device in connection to one of the axis 51 as they are connected by the driving axis 69. The driving axis 69 is preferably a cardan axis 69 which allows the axis 51 of the driving wheels 3a, 3c to be connected off-set in relation to each other wherein the axis is still allowed to rotate and transfer a rotational movement between driving wheels 3a, 3b, i.e. wherein it is ensured that the driving wheels rotate with the same rotational speed. The structure and set up of a cardan axis 69 is well-known in the art, however one exemplary embodiment of such cardan axis 69 in this application will be further explained in FIG. 16.

FIG. 15a-15d shows another embodiment, with minor changes compared to that of FIG. 14a-14d, wherein the axis 51a and its type of friction body is arranged within the driving wheels 3a, 3c to engage an inner surface of a the driving wheel 3a, 3c to transfer a rotational movement of the driving wheels 3a and 3c to a rotational movement of the axis 51a. The axis 51a preferably consists of two parallel wheels with any suitable type of friction bodies on their peripheral surfaces, whereby one wheel is arranged inside the driving wheel 3a, 3c and the other is arranged outside the driving wheel 3a, 3c and further connected to a driving belt 50, further being connected to axis 51b for transfer of rotational movement between the axis 51a to axis 51b. The axis 51b is connected to for instance a gearwheel 70 and/or to a generator (not shown) for further transforming rotational energy to electrical energy. The cardan axis 69 is arranged between the axis 51b similar to the embodiment according to FIG. 14a-d, preferably rotatably arranged on an extension of the frame 2. Similar to FIG. 14a-d, the water flows in a y-direction according to the coordinate system as seen in FIG. 15c FIG. 16-19 shows parts of the energy production device 60 enabling such parallel shift between the set of driving wheels 3a, 3c.

Figure 16:
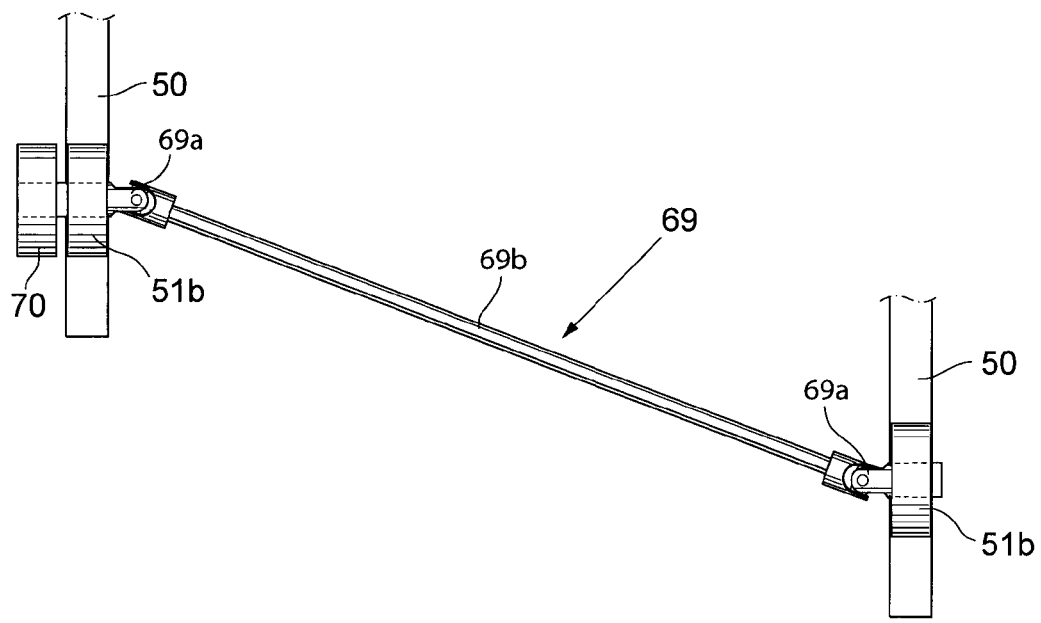
FIG. 16 shows a driving axis according to one embodiment of the invention.

FIG. 16 shows a detailed view of axis 51b and the cardan axis 69 according to the embodiment of FIG. 15a-d. The cardan axis 69 comprises a first portion 69a arranged in the axis 51b, a second, central portion 69b and a third portion 69c similar to that of the first portion but arranged in axis 51b.

Figure 17A:
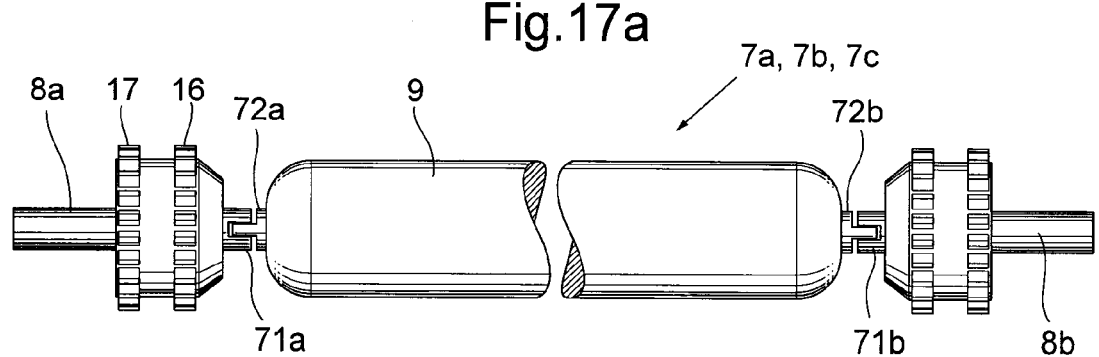
FIG. 17a shows a shovel roller according to one embodiment of the invention.
Figure 17B:
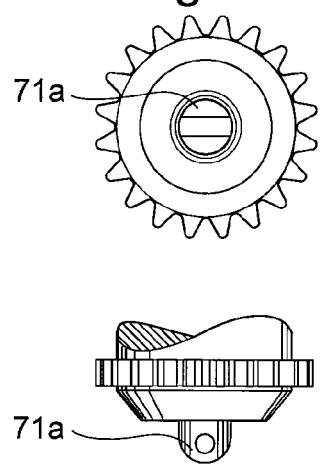
Figure 17C:
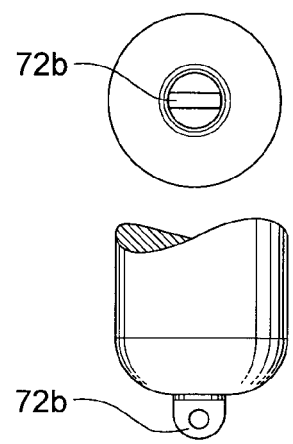

FIG. 17a shows a shovel roller 7a, 7b, 7c according to one embodiment of the invention wherein the first 8a and second end 8b of the shovel roller can be off-set, i.e. parallel shifted in relation to each other to comply with the change of direction of the energy production device 60 in relation to the flow of water direction as explained above. The ends 8a and 8b are rotatably arranged in the first 6a and second track 6b respectively or fixed in relation to the track 6a, 6b and rotate in relation to the tooth device 17 via a bearing device (not shown). A friction device 16 and the tooth device 17 are arranged together in connection to the end device 8a via a fork connection device 71a, 71b, 72a, 72b. A first hinge portion 71a, 71b connects the first end 8a to the cylinder-shaped device 9. A detailed view of the hinge portion, according to one embodiment is shown in FIG. 17b and FIG. 17c, wherein the female portion 71a is connected to the first end 8a and a male portion 72a adaped to fit into the female portion 71a is connected to the cylinder-shaped device 9. A pin securely locks the female portion with the male portion (not shown), through an aligned holes of the hinge portions. A relative rotational movement is hence enabled of the female and male portions around the pin. In an analogous manner, the second end 8b is connected to the cylinder-shaped device 9 by a second hinge portion 71b, 72b, wherein a female portion 71b is connected to the second end 8b and the second end of the cylinder-shaped device is connected to a male end 72b wherein a pin securely locks the female portion with the male portion and enables relative rotational movement there between. The cylinder shaped device 9 is rotatably arranged around the axis extending through the center of the cylinder-shaped device. Naturally, the arranging of female and male portions may be mirrored compared to that explained above. The edges of the cylinder-shaped device and the friction device 16/tooth device 17 direction towards the hinge portions 71a, 71b, 72a, 72c are rounded in order to prevent the carpet-like device 10 from undesirable clamping.

Figure 18:
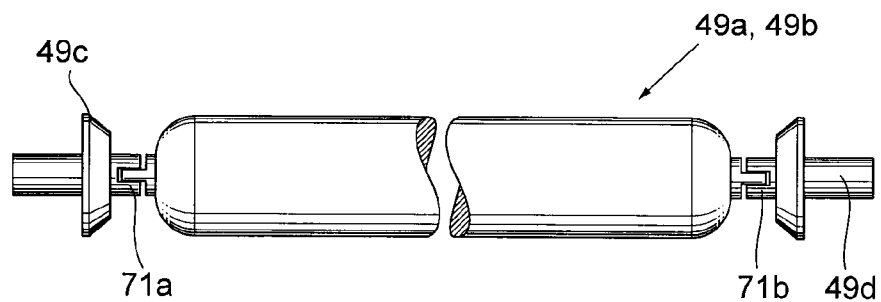
FIG. 18 shows a frame roller according to one embodiment of the invention.
Figure 19:
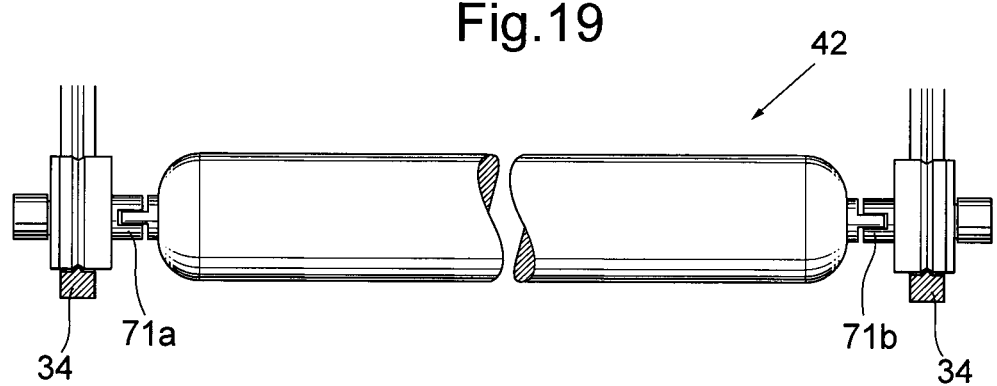
FIG. 19 shows an inner shovel roller according to one embodiment of the invention.

FIG. 18 shows a frame roller 49a, 49b adapted in a similar manner to that of the shovel roller in FIG. 17a-17c in order to enable a parallel shift between the set of driving wheels. FIG. 19 shows an inner shovel roller 42 adapted in a similar manner to that of the shovel roller in FIG. 17a-17c in order to enable a parallel shift between the set of driving wheels 3a, 3c. It should be understood that the fork connection devices described in connection to Fig. shovel rollers 7, inner shovel rollers 42 and frame rollers 49 according to another embodiment may be a cardan axis similar to the driving axis 69 described in for instance FIG. 14 and FIG. 15.

The invention claimed is:

1. An apparatus for propelling a boat or producing energy from wind, waves or flowing water, the apparatus comprising;
a first track;
a second track;
driving wheels each having a peripheral surface comprising a friction device, rotatably arranged in at least one frame, wherein
the first track is arranged in contact with the friction devices at a first set of driving wheels,
the second track is arranged in contact with the friction devices at a second set of driving wheels,
such that the tracks move with the same speed as the peripheral surface of the rotatable driving wheels where the track is in contact with the friction devices when the driving wheels rotate;
wherein a plurality of shovel rollers each comprise
a first and a second end and between the ends a device with an outer periphery,
wherein the first ends of the shovel rollers are arranged in the first track and the second ends of the shovel rollers are arranged in the second track such that the shovel rollers move with the tracks in relation to the frame when the driving wheels rotate, wherein the apparatus further comprises a flat continuous carpet-like device with side-ends which is arranged between the first and second sets of driving wheels and abutting the outer periphery of the shovel rollers;

that the carpet-like device forms a shovel surface between two of the shovel rollers, and that the formed shovel moves in relation to the frame when the shovel rollers move in relation to the frame.

2. The apparatus according to claim 1, wherein the first track is integrated with a first set of driving wheels and the second track is integrated with a second set of drive wheels.

3. The apparatus to claim 1, wherein the said plurality of shovel rollers between the ends comprise an essentially cylinder-shaped device wherein the ends are rotatably arranged in the tracks.

4. The apparatus according to claim 3, wherein the essentially cylinder-shaped device of the shovel rollers further comprise a tooth device and a friction device near the ends of the shovel rollers on the outer periphery of the shovel rollers; and that a portion of side-ends of carpet-like device are arranged in contact with the friction device such that the carpet-like device moves with the same speed as a point on the outer periphery of the shovel rollers where the side-ends of the carpet-like device are arranged in contact with friction device when the shovel rollers rotate in relation to the tracks;

that the apparatus further comprises a first and second carpet feeding device with an outer periphery respectively arranged on each frame between the first and second set of driving wheels, comprising a tooth receiving surface along a part-length of the outer periphery of the carpet feeding device and that the tooth devices of the shovel rollers meshes with the tooth receiving surfaces along a part-length of the outer periphery of the carpet feeding device, such that the shovel rollers are brought to rotate when the shovel rollers move in relation to the frame along a part-length of the outer periphery of the carpet feeding device.

5. The apparatus according to claim 4, wherein a trolley track is arranged along a surface on the first and the second carpet feeding device, between the first and the second set of rotatable driving wheels.

6. The apparatus according to claim 5, wherein the trolley track has a first end and a second end essentially shaped as half circles with sections there between being essentially straight, the essentially straight section comprising a first side of the trolley track, and where a stop edge is arranged to follow the straight section of the first side of the trolley track.

7. The apparatus according to claim 5, wherein the trolley track comprises an inner and an outer track.

8. The apparatus according to claim 7, wherein the a plurality of trolley tracks are movably arranged along the trolley track to follow the trolley track, the trolleys comprising a first and a second trolley wall, two roller bearings placed between the first and second trolley wall such that when the trolleys are movably arranged along the trolley track the two roller bearings are between the inner and the outer track.

9. The apparatus according to claim 8, wherein slide mounts are arranged on the first trolley walls, comprising two ends essentially shaped as half circles and an essentially straight section between the ends; and that the slide mounts have an inner and an outer surface.

10. The apparatus according to claim 9, wherein the inner shovel rollers are slidably arranged and rotatably arranged along the outer surface of the slide mounts and that the inner shovel rollers extend from slide mounts arranged in a trolley track on the first carpet feeding device to parallel slide mounts arranged in a trolley track on the second carpet feeding device; and that the carpet-like device forms a shovel surface by that the carpet-like device is led around an inner shovel roller and that the inner shovel roller is held in a position corresponding to first end of the slide mount due to the stop edge.

11. The apparatus according to claim 7, wherein frame rollers are arranged in frame roller fasteners arranged inside the inner tracks of the trolley tack at the ends of the trolley track, that the frame rollers extend from the frame roller fasteners arranged on the trolley track on the first carpet feeding device to the frame rollers arranged on the trolley track on the second carpet feeding device.

12. The apparatus according to claim 4, wherein the essentially cylinder-shaped device of the shovel rollers has a notch near the ends of the shovel rollers such that the cylinder-shaped device at the bottom of the notch has a radius that is less than at its outer periphery.

13. The apparatus according to claim 12, wherein the notch is located between the tooth device and the friction device.

14. The apparatus according to claim 12, wherein carpet holding devices are fixedly arranged on the tracks at points in the axial extensions of the shovel rollers, wherein a protruding portion of the of the carpet holding device is directed towards the notch in the shovel roller such that a portion of the carpet-like device is between the protruding portion of the carpet holding device and the notch in the shovel roller.

15. The apparatus according to claim 1, further comprising a driving device fixedly arranged in the tracks in close connection to and on each side of the attachment of the shovel rollers to the tracks.

16. The apparatus according to claim 1, wherein ground protection devices consisting of a flexible material is arranged in the tracks and extend from the first track to the second track at a point in the tracks outside the respective shovel roller such that a portion of the carpet-like device is between the shovel roller and the ground protection device.

17. A craft, wherein the apparatus according to claim 1 is arranged on the craft in order to propel the craft in water or on land.

18. An energy production device for generation of energy, wherein the apparatus according to claim 1 is arranged over, on or below the water level for generation of energy when wind, waves or flowing water brings the shovel of the apparatus to move in relation to the frame, such that this movement can be used for mechanically driving another device or for storing energy in an energy storing device.

19. The energy production device according to claim 18, wherein the first set of driving wheels are adapted to be parallel shifted in relation to the second set of driving wheels ($3c$, $3d$), wherein an angle of incident water in relation to the extension direction of the shovel rollers can be adjusted.

20. The energy production device according to claim 19, wherein the first set of driving wheels are connected to the second set of driving wheels via a driving axis, wherein the driving axis is a cardan axis.

21. The ene production device according to claim 19, wherein the angle of incident water in relation to the extension direction of the shovel rollers is preferably adapted to be adjusted to between 45°-90°.

* * * * *